United States Patent
Zhou et al.

(10) Patent No.: US 12,466,950 B2
(45) Date of Patent: Nov. 11, 2025

(54) PHTHALONITRILE-BASED COMPOSITE MATERIAL, PREPARATION METHOD THEREFOR AND USE THEREOF

(71) Applicant: INSTITUTE OF CHEMISTRY, CHINESE ACADEMY OF SCIENCES, Beijing (CN)

(72) Inventors: Heng Zhou, Beijing (CN); Ying Guo, Beijing (CN); Tong Zhao, Beijing (CN); Xianyuan Liu, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 344 days.

(21) Appl. No.: 17/998,515

(22) PCT Filed: May 11, 2021

(86) PCT No.: PCT/CN2021/093026
§ 371 (c)(1),
(2) Date: Nov. 11, 2022

(87) PCT Pub. No.: WO2021/228081
PCT Pub. Date: Nov. 18, 2021

(65) Prior Publication Data
US 2023/0193023 A1    Jun. 22, 2023

(30) Foreign Application Priority Data

May 11, 2020 (CN) .......................... 202010394333.2
Nov. 24, 2020 (CN) .......................... 202011331086.8

(51) Int. Cl.
*C08L 71/08* (2006.01)
*C08K 3/04* (2006.01)
*C08K 3/22* (2006.01)

(52) U.S. Cl.
CPC ............ *C08L 71/08* (2013.01); *C08K 3/04* (2013.01); *C08K 2003/2227* (2013.01); *C08K 2201/001* (2013.01); *C08K 2201/014* (2013.01)

(58) Field of Classification Search
None
See application file for complete search history.

(56) References Cited

U.S. PATENT DOCUMENTS

2011/0108755 A1    5/2011   Laskoski et al.

FOREIGN PATENT DOCUMENTS

| CN | 102234828 A   | 11/2011 |
|----|---------------|---------|
| CN | 103709746 A   | 4/2014  |
| CN | 106632274 A   | 5/2017  |
| CN | 109181283 A   | 1/2019  |
| JP | 863199228 A   | 8/1988  |
| WO | 2017003250 A1 | 1/2017  |

OTHER PUBLICATIONS

Derradji et al. Thermal and Mechanical Properties Enhancements Obtained by Reinforcing a Bisphenol-A Based Phthalonitrile Resin with Silane Surface-Modified Alumina Nanoparticles, Polymer Composites, 2017 p. 1549-1558. (Year: 2017).*
Lei et al. Mechanical and Thermal Properties of Graphite Nanoplatelets Reinforced Polyarylene Ether Nitriles /Bisphthalonitrile IPN system, J. Appl. Polym. Sci. 2013 p. 3595. (Year: 2013).*
Liu et al. Effective Thermal Conductivity and Thermal Properties of Phthalonitrile Terminated Poly(arylene ether nitriles) Composites with Hybrid Functionalized Alumina, J. Appl. Polym. Sci. 2015 p. 41595 (Year: 2015).*
Liu et al. Polyarylene Ether Nitrile and Barium Titanate Nanocomposite Plasticized by Carboxylated Zinc Phthalocyanate Buffer, Polymers 2019, 11, 418 (Year: 2019).*
Liu et al. Thermally Conductive and Electrically Insulating Alumina Coated Graphite/Phthalonitrile Composites with Thermal Stabilities. Composites Science and Technology 202 (2021) 108558 (Year: 2021).*

* cited by examiner

*Primary Examiner* — Katarzyna I Kolb
(74) *Attorney, Agent, or Firm* — NKL Law; Allen Xue

(57) ABSTRACT

A phthalonitrile-based composite material has a thermally conductive filler. The thermally conductive filler is distributed in the phthalonitrile matrix resin, or the thermally conductive filler is distributed in a thermally conductive filler layer at least partially covering the surface of the phthalonitrile-based microspheres. The phthalonitrile-based composite material has good application prospects in the fields of heat conduction and heat conductive insulation.

11 Claims, 6 Drawing Sheets

PHTHALONITRILE-BASED COMPOSITE MATERIAL, PREPARATION METHOD THEREFOR AND USE THEREOF

CROSS-REFERENCE TO RELATED APPLICATIONS

This application is a U.S. national stage entry of PCT International Application No. PCT/CN2021/093026, filed on May 11, 2021, which claims priority to Chinese Patent Application No. 202010394333.2 filed with China National Intellectual Property Administration on May 11, 2020, entitled "PHTHALONITRILE-BASED COMPOSITE MATERIAL, PREPARATION METHOD THEREFOR AND USE THEREOF"; and Chinese Patent Application No. 202011331086.8 filed with China National Intellectual Property Administration on Nov. 24, 2020, entitled "HIGH-THERMAL-CONDUCTIVITY AND INSULATING PHTHALONITRILE-BASED COMPOSITE MATERIAL AND PREPARATION METHOD AND APPLICATION THEREOF", the content of each is incorporated herein by reference in its entirety.

TECHNICAL FIELD

The present disclosure relates to the field of polymer composite materials, and particularly to a phthalonitrile-based composite material, a method for preparing the same and use of the same.

BACKGROUND

In the 5G era, the fields of electronics, communication, new energy, aerospace and the like are experiencing rapid development. The trend towards high power, high integration, light weight and miniaturization is increasingly significant in electronic equipment, communication devices and automatic intelligent equipment, resulting in the increasingly prominent heat dissipation problem for devices. If the accumulated heat can't be transferred to the surrounding environment in time, the performance and service life of the devices will be seriously affected. Polymer-based composite materials are widely applied in the field of thermal conduction due to the advantages of high strength, low density, good formability, chemical corrosion resistance, low cost and the like. An ideal packaging material should have good thermal conduction and insulation performance, and for some electrical components with long-term high heat generation, the higher service temperature also places higher requirements on the heat resistance of the material.

As a macromolecular polymer, phthalonitrile resin has the advantages of high glass transition temperature (greater than 450° C.), excellent heat resistance, low hydroscopicity, good flame retardancy, good mechanical properties and the like, and is widely applied in the fields of aerospace, shipping, machinery and electronic materials. However, the low thermal conductivity of phthalonitrile resin severely restricts its application in the field of electronics. At present, the thermally conductive and insulating polymer-based composite material is generally prepared by adding an inorganic ceramic filler to a polymer, but the economic effect of the ceramic fillers is affected by the high cost, so there is an urgent need to develop a novel filler with excellent performance and low cost.

Graphite as a carbon material has remarkable advantages of low cost, high thermal conductivity, high temperature resistance, low coefficient of thermal expansion, low density, stable chemical properties and the like. Graphite with lamellar structure is considered to be a relatively suitable filler for preparing a thermally conductive polymer composite material, but it degrades the insulation performance of the composite material. How to ensure both thermal conduction and insulation performance of a polymer-based composite material even after adding a filler has become a technical problem to be solved urgently.

Furthermore, the addition of a highly thermally conductive filler to a polymer matrix is an economical and reliable method for preparing a highly thermally conductive material. The traditional random filling method usually requires a large amount of filler to generate a thermally conductive network, and the high content of filler will cause the composite material to have the defects of poor mechanical properties, machining difficulty, high density, high cost and the like.

The preparation of three-dimensional continuous thermally conductive network in a polymer matrix is one of the most efficient and promising methods to achieve high thermal conductivity. At present, the methods for constructing three-dimensional continuous thermally conductive network mainly include lyophilization, self-assembly, ice-templating, chemical vapor deposition, three-dimensional braiding and the like. However, most of the methods for manufacturing the three-dimensional continuous thermally conductive network are relatively complex and have high process cost and difficulty in large-scale production, so there is still a long way to go for the industrial application of these methods. Therefore, there is an urgent need to develop a simple and efficient method for preparing a polymer-based composite material with a three-dimensional continuous thermally conductive network structure.

SUMMARY

The present disclosure provides a phthalonitrile-based composite material, which comprises a thermally conductive filler, wherein,
the thermally conductive filler is distributed in a phthalonitrile matrix resin, or the thermally conductive filler is distributed in a thermally conductive filler layer at least partially coating the surface of a phthalonitrile-based microsphere.

According to an embodiment of the present disclosure, the thermally conductive filler may be selected from at least one of the following materials: metal, ceramic, carbon material, composite material of metal, ceramic and/or carbon material, and the like. Illustratively, the thermally conductive filler is selected from one or two or more of copper, silver, aluminum, aluminum oxide, silicon nitride, silicon carbide, aluminum nitride, silicon nitride, boron nitride, graphite, graphene, carbon nanotube and aluminum oxide @ graphite composite material.

According to an embodiment of the present disclosure, a phthalonitrile monomer forming the phthalonitrile resin is selected from a compound having a structure as shown in formula (1):

Formula (1)

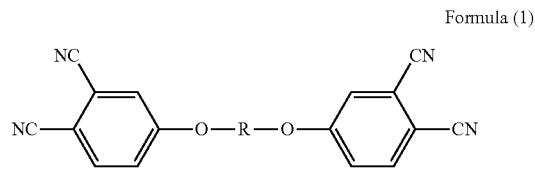

wherein R is selected from any one of the following structures:

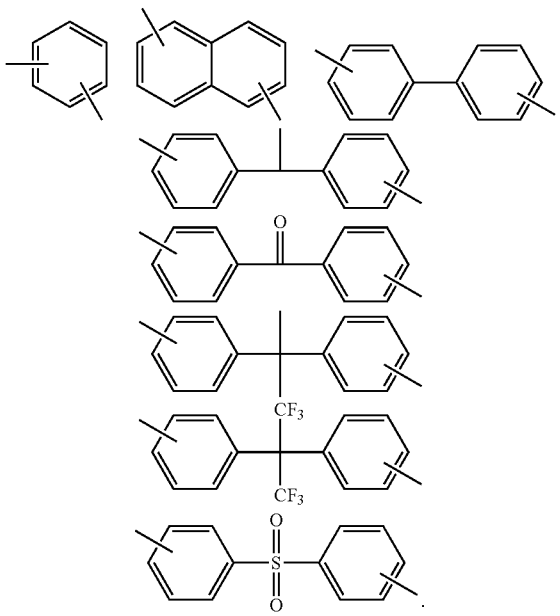

According to an embodiment of the present disclosure, the composite material has a coefficient of thermal conductivity of at least $0.2\ W \cdot m^{-1} \cdot K^{-1}$, for example, $0.2$-$5.0\ W \cdot m^{-1} \cdot K^{-1}$, preferably $0.2$-$0.7\ W \cdot m^{-1} \cdot K^{-1}$ or $2.2$-$5.0\ W \cdot m^{-1} \cdot K^{-1}$.

According to an embodiment of the present disclosure, the composite material has a volume resistivity of no less than $10^{10}\ \Omega \cdot cm$, preferably no less than $10^{11}\ \Omega \cdot cm$, and more preferably greater than $10^{11}\ \Omega \cdot cm$.

The present disclosure provides an aluminum oxide @ graphite composite material, which has a core-shell structure, wherein the shell layer is aluminum oxide, the core is a graphite particle, and the aluminum oxide coats the surface of the graphite particle.

The present disclosure further provides a method for preparing the aluminum oxide @ graphite composite material described above, comprising the following steps:
(1) dispersing graphite and an anionic surfactant in deionized water to enable the anionic surfactant to completely cover the graphite, thus obtaining a stable and homogeneous mixed liquid;
(2) adding dropwise an aluminum salt solution and a base solution simultaneously to the mixed liquid obtained in the step (1), reacting under stirring, filtering after the reaction is completed to obtain a precipitate, and subjecting the precipitate to workup to obtain a powder; and
(3) performing calcination on the powder obtained in the step (2) to obtain the aluminum oxide @ graphite composite material.

The present disclosure further provides an aluminum oxide @ graphite composite material prepared by the method described above.

The present disclosure further provides use of the aluminum oxide @ graphite composite material described above as a thermally conductive filler, and preferably as a thermally conductive filler for phthalonitrile-based resin.

The present disclosure further provides a phthalonitrile-based composite material, which comprises the aluminum oxide @ graphite composite material described above.

The present disclosure further provides a method for preparing the phthalonitrile-based composite material described above, which comprises the following step: allowing the phthalonitrile-based composite material to be prepared from a starting material comprising the aluminum oxide @ graphite composite material.

The present disclosure further provides a phthalonitrile-based composite material prepared by the method described above.

The present disclosure further provides use of the phthalonitrile-based composite material in the fields of thermal conduction and insulation; preferably, the composite material is used in electrical components.

The present disclosure provides a phthalonitrile-based composite material having a core-shell structure, which comprises an inner core and at least one thermally conductive filler layer, wherein the inner core is a phthalonitrile-based microsphere, and the thermally conductive filler layer at least partially coats the surface of the inner core. Preferably, the thermally conductive filler layer completely coats the surface of the inner core.

The present disclosure further provides a method for preparing the phthalonitrile-based composite material having the core-shell structure described above, which comprises the following step: at least partially coating the surface of a phthalonitrile-based microsphere with a thermally conductive filler layer to obtain the phthalonitrile-based composite material.

The present disclosure further provides a phthalonitrile-based composite material having a core-shell structure prepared by the method described above.

The present disclosure further provides use of the phthalonitrile-based composite material having the core-shell structure described above for preparing a phthalonitrile-based composite material with a three-dimensional continuous thermally conductive network structure.

The present disclosure further provides a phthalonitrile-based composite material with a three-dimensional continuous thermally conductive network structure, which is prepared from the phthalonitrile-based composite material having the core-shell structure described above.

The present disclosure further provides a method for preparing the phthalonitrile-based composite material with the three-dimensional continuous thermally conductive network structure described above, which comprises the following step: allowing the phthalonitrile-based composite material with the three-dimensional continuous thermally conductive network structure to be prepared from a starting material comprising the phthalonitrile-based composite material having the core-shell structure. Preferably, the phthalonitrile-based composite material with the three-dimensional continuous thermally conductive network structure is obtained from the phthalonitrile-based composite material having the core-shell structure described above by a hot-pressing reaction.

The present disclosure further provides a phthalonitrile-based composite material with a three-dimensional continuous thermally conductive network structure prepared by the method described above.

The present disclosure further provides use of the phthalonitrile-based composite material having the core-shell structure and/or the phthalonitrile-based composite material with the three-dimensional continuous thermally conductive network structure in the field of thermal conduction.

Beneficial Effects of Present Disclosure

The present disclosure provides a composite material comprising a phthalonitrile resin and a thermally conductive filler, wherein the thermally conductive filler is tightly bound to the phthalonitrile resin with a low porosity, and the composite material has the properties of high thermal conductivity and high volume resistivity.

The aluminum oxide @ graphite shell-core composite material, the phthalonitrile-based composite material, the methods for preparing the same and use of the same provided by the present disclosure have three advantages as follows:

(1) The present disclosure provides an aluminum oxide @ graphite shell-core composite material as a filler for phthalonitrile-based composite material, which differs from an inorganic ceramic filler with high cost and from a metal filler that is easily corroded and conductive. The aluminum oxide @ graphite shell-core composite material is coated with an aluminum oxide insulating layer on the surface of graphite and has the remarkable advantages of graphite as a carbon material, such as low cost, high thermal conductivity, high temperature resistance, low coefficient of thermal expansion, low density, stable chemical properties and the like. In addition, the aluminum oxide @ graphite shell-core composite material can construct a thermally conductive network in a phthalonitrile resin matrix, and improves the thermal conduction performance of the phthalonitrile-based composite material while maintaining a high volume resistivity of the composite material to meet the insulation requirements.

(2) The method for preparing the aluminum oxide @ graphite shell-core composite material provided by the present disclosure can control the content of aluminum oxide by adjusting the proportion of starting materials, and has mild reaction conditions and a simple and controllable process. The prepared aluminum oxide @ graphite core-shell composite material has high yield, low cost and good performance.

(3) The present disclosure provides a thermally conductive and insulating phthalonitrile-based composite material and a method for preparing the same. The phthalonitrile-based composite material has good thermal conduction and insulation performance, and can well solve the problems of heat dissipation, electrical insulation and heat resistance of high power appliances when applied to electrical components.

The present disclosure provides a composite material comprising a phthalonitrile resin and a thermally conductive filler, wherein the thermally conductive filler is distributed in a thermally conductive filler layer at least partially coating the surface of a phthalonitrile-based microsphere. The composite material can show good thermal conduction performance at a low content of thermally conductive filler, effectively overcomes the problem that a thermally conductive network is generated only at a high content of thermally conductive filler, and has good insulation performance.

The phthalonitrile-based composite material having the core-shell structure, the method for preparing the same and use of the same provided by the present disclosure have three advantages as follows:

(1) The method for preparing the phthalonitrile-based core-shell composite material provided by the present disclosure adopts a phthalonitrile resin as an adhesive without introducing other substances, and is a self-adhesive method that maintains the properties of the phthalonitrile-based composite material to the greatest extent. The method can precisely control the content of the thermally conductive filler and the number of layers of the thermally conductive filler by adjusting the proportion of starting materials, has mild reaction conditions and a simple and controllable process, and is suitable for large-scale production. The prepared phthalonitrile-based core-shell composite material has high yield, low cost and good performance.

(2) The phthalonitrile-based composite material with the three-dimensional continuous thermally conductive network structure and the method for preparing the same provided by the present disclosure is prepared from the phthalonitrile-based core-shell composite material by a hot-pressing reaction. The phthalonitrile-based composite material with the three-dimensional continuous thermally conductive network structure has a phase-separated structure, and the thermally conductive filler is a continuous phase. At a low content of thermally conductive filler, a thermally conductive path can be formed and a thermally conductive network can be effectively constructed. The novel material structure design and processing method allow this material to be widely applied in the field of thermal conduction. Moreover, the phthalonitrile-based composite material with the three-dimensional continuous thermally conductive network structure has good electrical insulation performance, thereby finally broadening the application area of phthalonitrile resin.

(3) The composite material with the three-dimensional continuous thermally conductive network structure provided by the present disclosure can show good thermal conduction performance at a low content of thermally conductive filler, effectively overcomes the problem that a thermally conductive network is generated only at a high content of thermally conductive filler, and has good insulation performance. Compared with a randomly filled polymer-based composite material, the composite material with the thermally conductive phase-separated structure has higher coefficient of thermal conductivity, simpler forming process, lower density and lower cost.

DETAILED DESCRIPTION

[Aluminum Oxide @ Graphite Composite Material]

Provided is the aluminum oxide @ graphite composite material as described above, which has a core-shell structure, wherein the shell layer is aluminum oxide, the core is a graphite particle, and the aluminum oxide coats the surface of the graphite particle.

According to an embodiment of the present disclosure, the aluminum oxide completely coats the surface of the graphite particle.

According to an embodiment of the present disclosure, the graphite particle has a size in the micron level; for example, the graphite particle has a particle size of 0.15-50 µm, such as 0.5-20 µm. According to an embodiment of the present disclosure, the aluminum oxide shell layer accounts for 5%-50%, preferably 10%-30%, and illustratively 9.07%, 10%, 15%, 18.37%, 20%, 24%, 25% or 30% by mass of the aluminum oxide @ graphite composite material.

Figure 2:
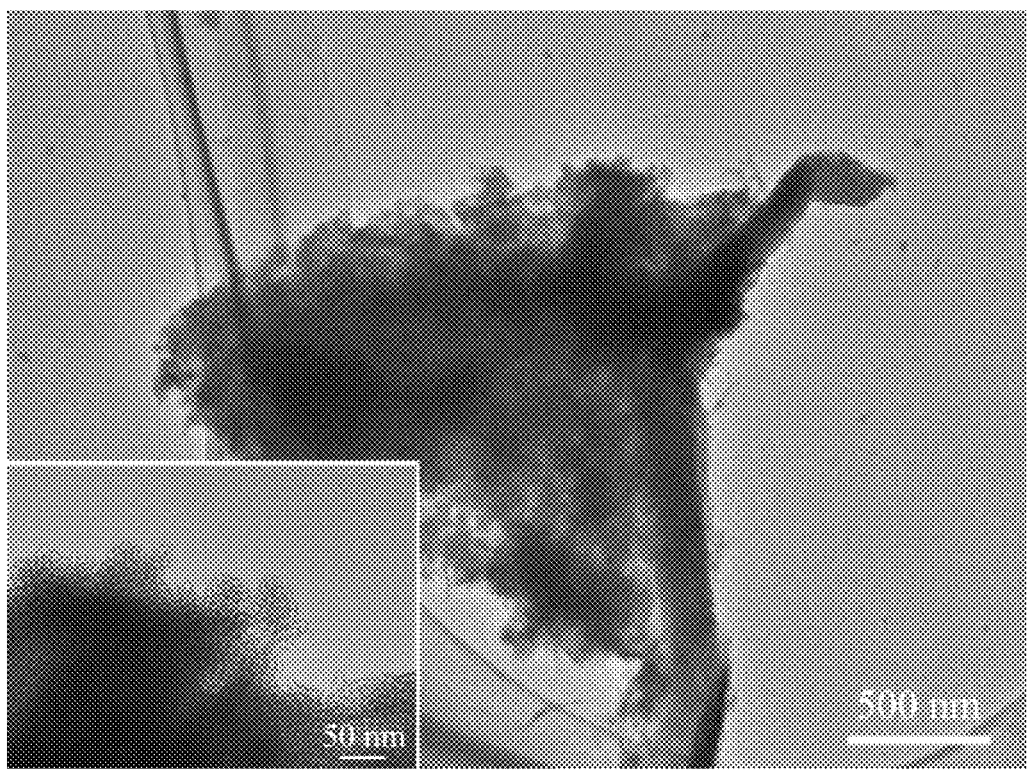
FIG. 2 shows a transmission electron microscopy (TEM) image of the aluminum oxide @ graphite core-shell composite particles prepared in Preparation Example A1.

According to an embodiment of the present disclosure, the aluminum oxide @ graphite composite material has a TEM topography substantially as shown in FIG. 2.

[Method for Preparing Aluminum Oxide @ Graphite Composite Material]

The method for preparing the aluminum oxide @ graphite composite material described above comprises the following steps:
(1) dispersing graphite and an anionic surfactant in deionized water to enable the anionic surfactant to completely cover the graphite, thus obtaining a stable and homogeneous mixed liquid;
(2) adding dropwise an aluminum salt solution and a base solution simultaneously to the mixed liquid obtained in the step (1), reacting under stirring, filtering after the reaction is completed to obtain a precipitate, and subjecting the precipitate to workup to obtain a powder; and
(3) performing calcination on the powder obtained in the step (2) to obtain the aluminum oxide @ graphite composite material.

According to an embodiment of the present disclosure, the graphite has the meaning as described above.

According to an embodiment of the present disclosure, the anionic surfactant is at least one of sodium dodecyl sulfonate, sodium dodecyl sulfate, and sodium secondary alkyl sulfonate, preferably sodium dodecyl sulfonate and/or sodium dodecyl sulfate.

According to an embodiment of the present disclosure, the aluminum salt is at least one of aluminum nitrate, aluminum sulfate, and a hydrate thereof, for example, aluminum nitrate nonahydrate and/or aluminum sulfate octadecahydrate.

According to an embodiment of the present disclosure, the base is at least one of sodium hydroxide, potassium hydroxide, sodium bicarbonate and potassium bicarbonate, for example, sodium hydroxide and/or potassium hydroxide.

According to an embodiment of the present disclosure, in the step (1), the dispersing is performed by ultrasonic dispersion. For example, the ultrasonic dispersion is performed at a power of 80-120 W, preferably 90-110 W, and illustratively 80 W, 90 W, 100 W, 110 W or 120 W. For example, the ultrasonic dispersion is performed for 10-60 min, preferably 20-40 min, and illustratively 20 min, 30 min or 40 min. For example, the ultrasonic dispersion is performed at a temperature of 70-90° C., preferably 75-85° C., and illustratively 70° C., 75° C., 80° C., 85° C. or 90° C.

According to an embodiment of the present disclosure, in the step (1), an amount of the anionic surfactant is 0.5%-30%, preferably 2%-7%, and illustratively 2%, 3%, 4%, 5%, 6% or 7% by mass of the graphite.

According to an embodiment of the present disclosure, in the step (1), a mass-to-volume ratio of the graphite to the deionized water is 1 g:(15-50) mL, for example, 1 g:(20-40) mL, and illustratively 1 g:20 mL, 1 g:30 mL, 1 g:40 mL or 1 g:50 mL.

According to an embodiment of the present disclosure, in the step (2), a mass ratio of the aluminum salt to the graphite is 1:(0.1-10), preferably 1:(0.5-2), and illustratively 1:0.64, 1:0.75, 1:1, 1:1.5 or 1:2.

According to an embodiment of the present disclosure, in the step (2), a molar ratio of the base to the aluminum salt is (2.7-3.3):1, preferably (2.9-3.1):1, and illustratively 3:1.

According to an embodiment of the present disclosure, in the step (2), a volume ratio of the aluminum salt solution to the mixed liquid and a volume ratio of the base solution to the mixed liquid are identical or different, and are, for example, 1:(5-30), preferably 1:(10-20), and illustratively 1:10, 1:15 or 1:20.

According to an embodiment of the present disclosure, in the step (2), the aluminum salt solution and the base solution are slowly added dropwise to the mixed liquid under stirring. For example, the time for the dropwise addition is not more than 2 h, such as 1-2 h. Furthermore, the system is maintained at a pH value of 6-7 during the dropwise addition.

According to an embodiment of the present disclosure, in the step (2), after the dropwise addition of the aluminum salt solution and base solution is completed, the resulting mixture is stirred and reacted for 2-4 h, for example, 2-3 h, and illustratively 2 h, 2.5 h or 3 h.

According to an embodiment of the present disclosure, in the step (2), the workup comprises washing and drying. For example, the precipitate is washed at least 2 times with ethanol. For example, vacuum drying is performed on the washed precipitate; further, the vacuum drying is performed at a temperature of 90-110° C., preferably 95-105° C., and illustratively 90° C., 100° C. or 110° C.; further, the vacuum drying is performed for 8-16 h, preferably 10-14 h, and illustratively 10 h or 12 h.

According to an embodiment of the present disclosure, in the step (3), the calcination is performed at a temperature of 400-800° C., preferably 500-600° C., and illustratively 500° C., 550° C. or 600° C. For example, the calcination is performed for 1-12 h, preferably 2-5 h, and illustratively 2 h, 3 h, 4 h or 5 h.

According to an embodiment of the present disclosure, in the step (3), the calcination is performed in a tubular furnace.

According to an illustrative embodiment of the present disclosure, the method for preparing the aluminum oxide @ graphite composite material comprises the following steps:
(1) ultrasonically dispersing graphite and an anionic surfactant in deionized water to enable the anionic surfactant to completely cover the graphite, thus obtaining a stable and homogeneous mixed liquid;
(2) slowly adding dropwise an aluminum salt solution and a base solution to the mixed liquid described above simultaneously under stirring, maintaining the system at a pH value of 6-7 during the dropwise addition, reacting under stirring after the dropwise addition is completed, filtering after the reaction is completed to obtain a precipitate, and subjecting the precipitate to workup to obtain a powder; and (3) performing calcination on the powder described above to obtain an aluminum oxide @ graphite composite material.

In the preparation, the aluminum salt provides aluminum ions to the solution, and the base provides hydroxide ions to the solution. After the anionic surfactant is dissolved in the deionized water, the alkyl end of the anionic surfactant binds to the graphite, and the anion at the other end binds to an aluminum ion in the solution. Meanwhile, the aluminum ions bind to the hydroxide ions in the solution to generate aluminum hydroxide to obtain composite particles of aluminum hydroxide-coated graphite, which are then calcined at high temperature to obtain an aluminum oxide @ graphite composite material.

The present disclosure further provides an aluminum oxide @ graphite composite material prepared by the method described above.

[Use of Aluminum Oxide @ Graphite Composite Material]

Provided is use of the aluminum oxide @ graphite composite material described above as a thermally conductive filler, preferably as a thermally conductive filler for phthalonitrile-based resin.

[Phthalonitrile-Based Composite Material]

Provided is the phthalonitrile-based composite material as described above, which comprises a thermally conductive filler, wherein the thermally conductive filler is distributed in a phthalonitrile matrix resin.

According to an embodiment of the present disclosure, the thermally conductive filler is selected from the aluminum oxide @ graphite composite material described above.

Provided is the phthalonitrile-based composite material as described above, which comprises the aluminum oxide @ graphite composite material described above. For example, the aluminum oxide @ graphite composite material accounts for 5%-50%, for example, 10%-30%, and illustratively 5%, 10%, 15%, 20%, 25% or 30% by mass of the phthalonitrile-based composite material.

According to an embodiment of the present disclosure, the aluminum oxide @ graphite composite material is uniformly distributed in the phthalonitrile matrix resin. Preferably, the aluminum oxide @ graphite composite material is tightly bound to the phthalonitrile matrix resin with a porosity of less than 2.5%.

According to an embodiment of the present disclosure, the aluminum oxide @ graphite composite material is mutually overlapped in the phthalonitrile matrix resin to form a thermally conductive path.

Figure 4:
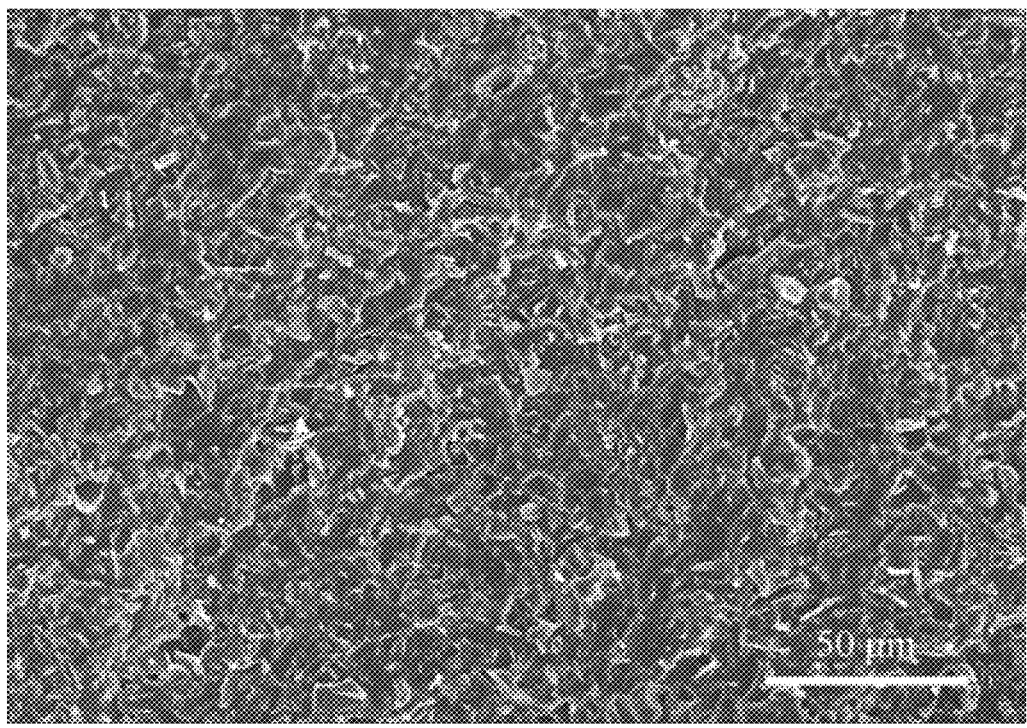
FIG. 4 shows a cross-sectional scanning electron microscopy (SEM) image of the phthalonitrile-based composite material filled with aluminum oxide @ graphite core-shell composite particles prepared in Example A3.

According to an embodiment of the present disclosure, the phthalonitrile-based composite material has a cross-sectional topography substantially as shown in FIG. 4.

According to an embodiment of the present disclosure, starting materials for preparing the phthalonitrile-based composite material comprise: 100 parts by weight of a phthalonitrile monomer, 1-10 parts by weight of a solidifier and 5-50 parts by weight of the aluminum oxide @ graphite composite material;

wherein the aluminum oxide @ graphite composite material has the meaning as described above.

According to an embodiment of the present disclosure, the phthalonitrile monomer is selected from a compound having a structure as shown in formula (1):

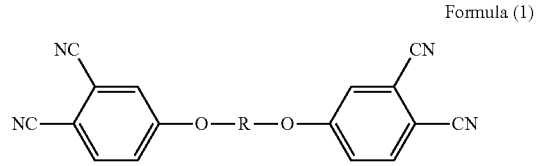

Formula (1)

wherein R is selected from any one of the following structures:

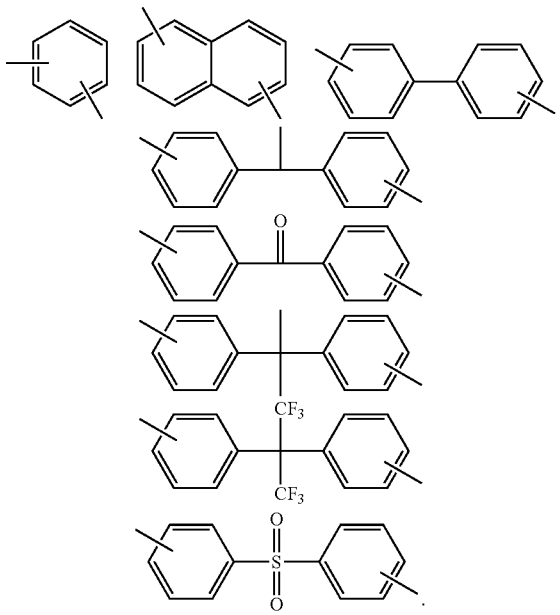

Preferably, R is selected from any one of the following structures:

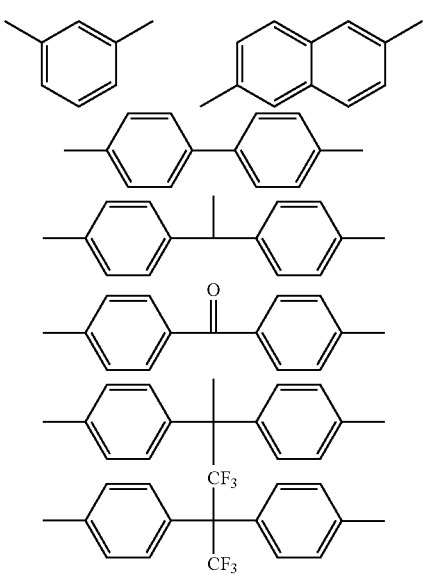

-continued

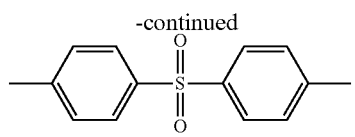

Illustratively, R is selected from any one of the following structures:

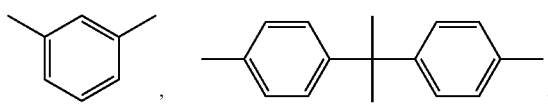

According to an embodiment of the present disclosure, the phthalonitrile monomer is selected from a compound having a structure as shown in formula (2) or formula (3):

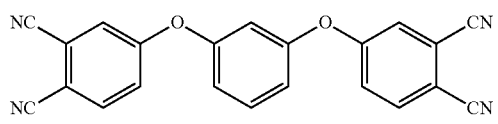
Formula (2)

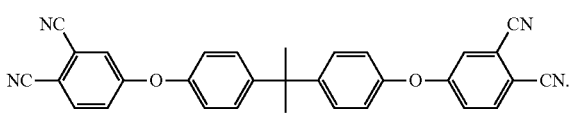
Formula (3)

According to an embodiment of the present disclosure, the solidifier is an amine-based solidifier which may be, for example, at least one of 4,4-diaminodiphenyl sulfone, 4,4'-diaminodiphenyl sulfone, 4-amino-(3,4-dicyanophenoxy)benzene, m-aminophenylacetylene and 4,4'-biphenyl-diamine; and illustratively 4-amino-(3,4-dicyanophenoxy)benzene.

According to an embodiment of the present disclosure, an amount of the solidifier is 2-8 parts by weight, and illustratively 2 parts, 3 parts, 4 parts, 5 parts, 6 parts, 7 parts or 8 parts by weight.

According to an embodiment of the present disclosure, an amount of the aluminum oxide @ graphite composite material is 10-30 parts by weight, and illustratively 11 parts, 11.625 parts, 12 parts, 15 parts, 18 parts, 18.5 parts, 20 parts, 25 parts, 26.25 parts or 30 parts by weight.

According to an embodiment of the present disclosure, the phthalonitrile-based composite material is prepared from the starting materials in parts by weight described above.

According to an embodiment of the present disclosure, the phthalonitrile-based composite material has a coefficient of thermal conductivity of 0.2-0.7 $W \cdot m^{-1} \cdot K^{-1}$. Preferably, the phthalonitrile-based composite material has a coefficient of thermal conductivity of 0.3-0.68 $W \cdot m^{-1} \cdot K^{-1}$.

According to an embodiment of the present disclosure, the phthalonitrile-based composite material has a volume resistivity of no less than $10^{10}$ $\Omega \cdot cm$, preferably no less than $10^{11}$ $\Omega \cdot cm$.

According to an embodiment of the present disclosure, the phthalonitrile-based composite material has a glass transition temperature of 450-465° C., preferably 455-462° C.

[Method for Preparing Phthalonitrile-Based Composite Material]

Provided is a method for preparing the phthalonitrile-based composite material described above, which comprises the following step: allowing the phthalonitrile-based composite material to be prepared from a starting material comprising the aluminum oxide @ graphite composite material.

Preferably, the phthalonitrile-based composite material is obtained from a blend comprising the phthalonitrile monomer, the solidifier and the aluminum oxide @ graphite composite material described above by a hot-pressing reaction.

According to an embodiment of the present disclosure, the preparation method comprises the following steps:
(1) homogeneously mixing the aluminum oxide @ graphite composite material with a phthalonitrile monomer and a solidifier by a melt blending method; and
(2) pouring the mixture obtained in the step (1) into a mold, performing first pre-curing under normal pressure, curing under increased pressure and post-curing under normal pressure after cooling and demolding to obtain the phthalonitrile-based composite material.

According to an embodiment of the present disclosure, the aluminum oxide @ graphite composite material, the solidifier and the phthalonitrile monomer have the meanings and amounts as described above.

According to an embodiment of the present disclosure, in the step (1), the melt blending is performed at a temperature determined according to the phthalonitrile monomer used. The time for the blending is 20 min-40 min, for example, 20 min, 25 min, 30 min, 35 min or 40 min.

According to an embodiment of the present disclosure, in the step (2), the pre-curing under normal pressure is performed at a temperature of 150-230° C., preferably 180-220° C., and illustratively 180° C., 190° C., 200° C., 210° C. or 220° C. The time for the pre-curing under normal pressure is 0.5-2.5 h, preferably 1-2 h, and illustratively 1 h, 1.5 h or 2 h.

According to an embodiment of the present disclosure, in the step (2), the curing under increased pressure is performed in stages; for example, in 2-4 stages, preferably in 2-3 stages. The curing under increased pressure in each stage is performed at a temperature of 230-300° C., preferably 230-280° C., and illustratively 230° C., 250° C. or 280° C. Preferably, the curing in each stage is performed at a temperature that is increased stage by stage. The time for the curing under increased pressure in each stage is identical or different and is, for example, 1-3.5 h, preferably 1.5-3 h, and illustratively 1 h, 1.5 h, 2 h, 2.5 h, 3 h or 3.5 h.

According to an embodiment of the present disclosure, in the step (2), the curing under increased pressure is performed under a pressure of 5-15 MPa, preferably 8-12 MPa, and illustratively 8 MPa, 10 MPa or 12 MPa.

According to an embodiment of the present disclosure, in the step (2), the cooling is natural cooling to room temperature.

According to an embodiment of the present disclosure, in the step (2), the post-curing under normal pressure is performed in stages, for example, in 2-4 stages. The post-curing under normal pressure in each stage is performed at a temperature of 300-400° C., preferably 315-375° C., and illustratively 315° C., 330° C., 350° C. or 375° C. Preferably, the curing in each stage is performed at a temperature that is increased stage by stage. The time for the post-curing under normal pressure in each stage is identical or different, and is selected from 4-6 h, for example, 4 h, 4.5 h, 5 h, 5.5 h or 6 h. Illustratively, under normal pressure, the post-curing is performed first at 315° C. for 5 h and then at 375° C. for 5 h.

The present disclosure further provides a phthalonitrile-based composite material prepared by the method described above.

[Use of Phthalonitrile-Based Composite Material]

The present disclosure further provides use of the phthalonitrile-based composite material in the fields of thermal conduction and insulation; preferably, the composite material is used in electrical components.

[Phthalonitrile-Based Composite Material Having Core-Shell Structure]

Provided is the phthalonitrile-based composite material as described above, which comprises a thermally conductive filler, wherein the thermally conductive filler is distributed in a thermally conductive filler layer at least partially coating the surface of a phthalonitrile-based microsphere.

According to an embodiment of the present disclosure, the composite material has a core-shell structure, i.e., comprises an inner core and at least one thermally conductive filler layer, wherein the inner core is a phthalonitrile-based microsphere, and the thermally conductive filler layer at least partially coats the surface of the inner core.

Preferably, the thermally conductive filler layer completely coats the surface of the inner core.

According to an embodiment of the present disclosure, the thermally conductive filler layer closest to the inner core is taken as a first thermally conductive filler layer, and a phthalonitrile resin layer may be further provided between the first thermally conductive filler layer and the inner core.

According to an embodiment of the present disclosure, when the number of layers of the thermally conductive filler layer is two, three or more, a phthalonitrile resin layer is provided between adjacent thermally conductive filler layers.

According to an embodiment of the present disclosure, the thermally conductive filler in each thermally conductive filler layer may be identical or different. For example, the thermally conductive filler may be selected from at least one of thermally conductive fillers such as metals, ceramics, carbon materials and the like; preferably one or two or more of copper, silver, aluminum, aluminum oxide, silicon nitride, silicon carbide, aluminum nitride, silicon nitride, boron nitride, graphite, graphene and carbon nanotube.

Preferably, the thermally conductive filler in the outermost thermally conductive filler layer cannot be a carbon material, the "outermost thermally conductive filler layer" refers to the thermally conductive filler layer farthest from the inner core, and when the thermally conductive filler layer is a single layer, the first thermally conductive filler layer is the outermost thermally conductive filler layer.

According to an embodiment of the present disclosure, the phthalonitrile-based core-shell composite material comprises: 45-85 parts by volume of the phthalonitrile-based microsphere and 5-50 parts by volume of the thermally conductive filler. For example, the phthalonitrile-based core-shell composite material comprises: 50-80 parts by volume of the phthalonitrile-based microsphere and 10-40 parts by volume of the thermally conductive filler, and illustratively, 50 parts, 55 parts, 60 parts, 65 parts, 70 parts, 75 parts or 80 parts by volume of the phthalonitrile-based microsphere, and 10 parts, 15 parts, 20 parts, 30 parts, 35 parts, 40 parts, 45 parts, or 50 parts by volume of the thermally conductive filler.

According to an embodiment of the present disclosure, the phthalonitrile-based core-shell composite material further comprises 5-10 parts by volume of the phthalonitrile resin, and illustratively 5 parts, 6 parts, 7 parts, 8 parts, 9 parts or 10 parts by volume of the phthalonitrile resin. The phthalonitrile resin is from the phthalonitrile resin layer.

For example, the phthalonitrile-based core-shell composite material comprises: 50-80 parts by volume of the phthalonitrile-based microsphere, 6-9 parts by volume of the phthalonitrile resin and 10-40 parts by volume of the thermally conductive filler. The phthalonitrile resin is from the phthalonitrile resin layer.

For another example, the phthalonitrile-based core-shell composite material comprises: 60-70 parts by volume of the phthalonitrile-based microsphere, 7-8 parts by volume of the phthalonitrile resin and 20-30 parts by volume of the thermally conductive filler. The phthalonitrile resin is from the phthalonitrile resin layer.

Preferably, the sum of the parts by volume of the phthalonitrile-based microsphere, the phthalonitrile resin and the thermally conductive filler is 100 parts.

In the present disclosure, the part by volume is calculated by: the part by mass of the material/the density of the material.

According to an embodiment of the present disclosure, the phthalonitrile resin in the phthalonitrile resin layer is not cross-linked.

According to an embodiment of the present disclosure, for subsequent reprocessing and reforming, the phthalonitrile-based microsphere is a product cured at 245-250° C., preferably 250° C., which has a low cross-linking density; specifically, the phthalonitrile-based microsphere is an incompletely cured product of the phthalonitrile compound, and can be re-melted at a temperature of no less than 280° C., for example, 280-350° C.

According to an embodiment of the present disclosure, the phthalonitrile-based microsphere is insoluble in an organic solvent, wherein for example, the organic solvent is selected from at least one of ethanol, acetone, n-propanol, dimethylformamide and the like, and illustratively acetone.

According to an embodiment of the present disclosure, the phthalonitrile-based microsphere is a microsphere known in the art. The phthalonitrile-based microsphere is prepared from a phthalonitrile resin identical to the phthalonitrile resin in the phthalonitrile resin layer.

According to an embodiment of the present disclosure, the phthalonitrile-based microsphere has a particle size of 0.05-300 μm, for example, 10-200 μm, and for another example, 80-190 μm.

According to an embodiment of the present disclosure, the phthalonitrile resin is a thermosetting resin. The thermosetting phthalonitrile resin has the advantages of excellent thermal stability, water resistance, flame retardancy, mechanical properties and the like, and is particularly suitable for the field of thermal conduction.

According to an embodiment of the present disclosure, the phthalonitrile resin is prepared from a starting material comprising a phthalonitrile monomer and a solidifier, wherein the phthalonitrile monomer is selected from a compound having a structure as shown in formula (1):

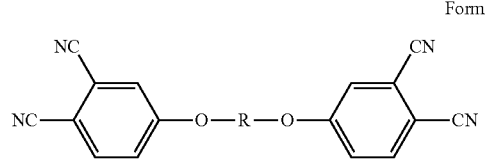

Formula (1)

wherein R is selected from any one of the following structures:

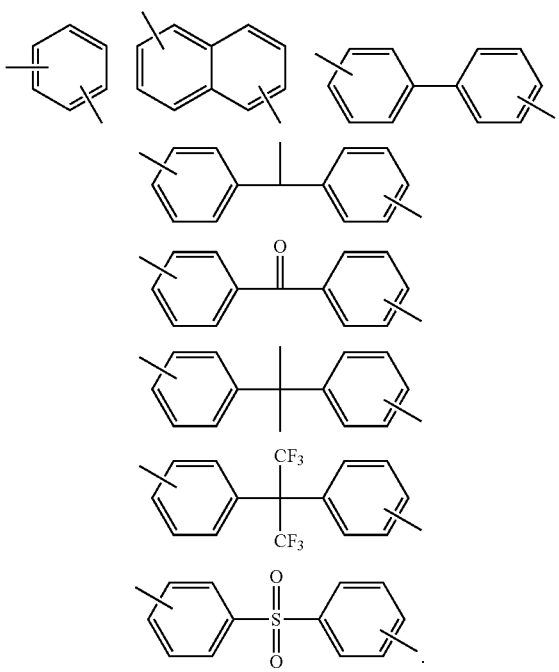

Preferably, R is selected from any one of the following structures:

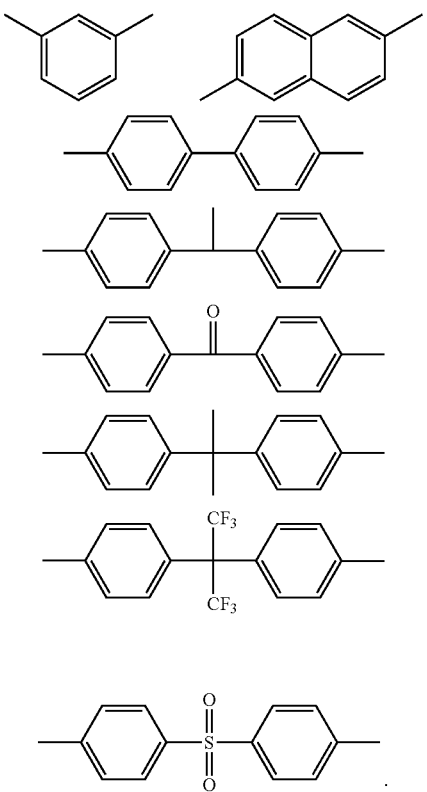

Illustratively, R is selected from any one of the following structures:

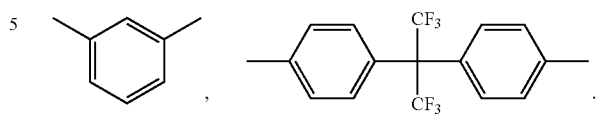

According to an embodiment of the present disclosure, the phthalonitrile monomer is selected from a compound having a structure as shown in formula (2) or formula (3'):

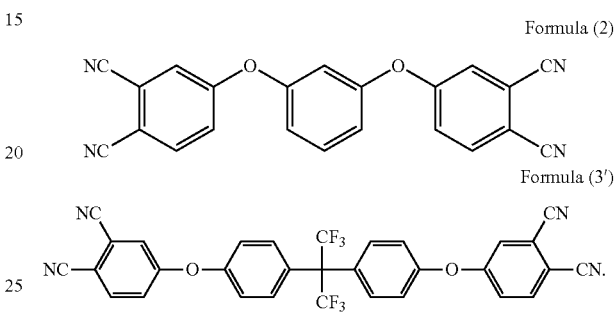

According to an embodiment of the present disclosure, the solidifier is an amine-based solidifier which may be, for example, at least one of 4,4-diaminodiphenyl sulfone, 3,3-diethyl-4,4,-diaminodiphenyl methane (H-256), 4-amino-(3,4-dicyanophenoxy)benzene, p-phenylenediamine, m-aminophenylacetylene and diethyl toluenediamine (DETDA); and illustratively 4-amino-(3,4-dicyanophenoxy)benzene.

According to an embodiment of the present disclosure, the solidifier accounts for 1%-12%, preferably 3%-6%, by mass of the phthalonitrile monomer.

According to an embodiment of the present disclosure, the at least one thermally conductive filler layer (also called shell layer) accounts for 5%-50%, preferably 10%-40%, and illustratively 10%, 15%, 20%, 25%, 30%, 35% or 40% by volume of the phthalonitrile-based core-shell composite material.

Figure 7:
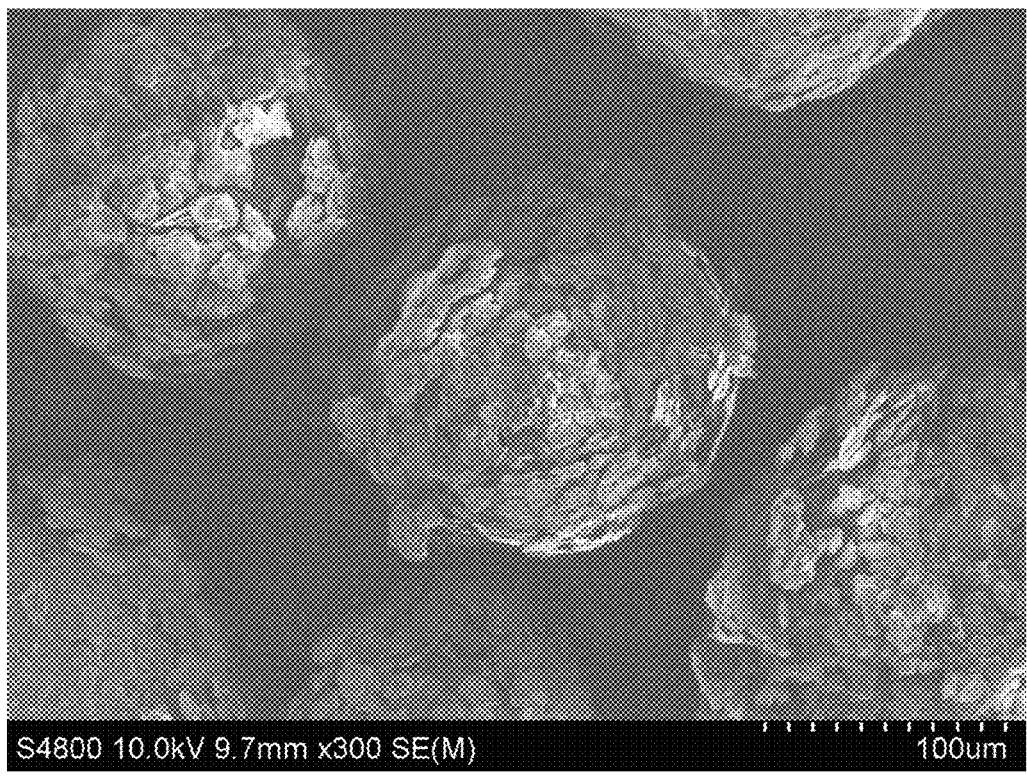
FIG. 7 shows a scanning electron microscopy (SEM) image of the single-layer boron nitride @ phthalonitrile-based composite material with a boron nitride volume fraction of 20% prepared in Preparation Example B1.

According to an embodiment of the present disclosure, the phthalonitrile-based core-shell composite material has an SEM topography substantially as shown in FIG. 7.

According to a preferred embodiment of the present disclosure, the phthalonitrile-based core-shell composite material may be:
  a phthalonitrile-based core-shell composite material having one thermally conductive filler layer, for example, a single-layer boron nitride @ phthalonitrile-based composite material, wherein the shell layer is boron nitride, the inner core is a phthalonitrile-based microsphere, and a phthalonitrile resin layer is provided between the boron nitride shell layer and the phthalonitrile-based microsphere; the boron nitride shell layer and the phthalonitrile resin layer can completely coat the microsphere therein; preferably, the boron nitride accounts for 20% by volume of the boron nitride @ phthalonitrile-based composite material;
  or a phthalonitrile-based core-shell composite material having two thermally conductive filler layers, for example, a boron nitride-graphite @ phthalonitrile-based composite material, wherein the thermally conductive filler layers include a boron nitride layer and a graphite layer, the boron nitride layer is the outermost layer, the inner core is a phthalonitrile-based microsphere, a phthalonitrile resin layer is provided between the boron nitride layer and the graphite layer, and between the graphite layer and the phthalonitrile-based microsphere; the boron nitride layer, the graphite layer and the phthalonitrile resin layer can completely coat the microsphere therein; preferably, the boron nitride and the graphite each account for 20% by volume of the boron nitride-graphite @ phthalonitrile-based composite material;

or a phthalonitrile-based core-shell composite material having three thermally conductive filler layers, for example, a boron nitride-aluminum oxide-graphite @ phthalonitrile-based composite material, wherein the thermally conductive filler layers include a boron nitride layer, an aluminum oxide layer and a graphite layer, the boron nitride layer is the outermost layer, the inner core is a phthalonitrile-based microsphere, a phthalonitrile resin layer is provided between adjacent thermally conductive filler layers, and between the first thermally conductive filler layer (which can be the aluminum oxide layer or the graphite layer) and the phthalonitrile-based microsphere; the boron nitride layer, the aluminum oxide layer, the graphite layer and the phthalonitrile resin layer can completely coat the microsphere therein; preferably, the boron nitride accounts for 20% by volume of the boron nitride-aluminum oxide-graphite @ phthalonitrile-based composite material, the aluminum oxide accounts for 10% by volume of the boron nitride-aluminum oxide-graphite @ phthalonitrile-based composite material, and the graphite accounts for 10% by volume of the boron nitride-aluminum oxide-graphite @ phthalonitrile-based composite material.

[Method for Preparing Phthalonitrile-Based Composite Material Having Core-Shell Structure]

The method for preparing the phthalonitrile-based composite material having the core-shell structure described above comprises the following step: at least partially coating the surface of the phthalonitrile-based microsphere with the thermally conductive filler layer to obtain the phthalonitrile-based composite material.

According to an embodiment of the present disclosure, the method specifically comprises the following step:

sequentially coating the surface of the phthalonitrile-based microsphere with the phthalonitrile resin layer and the first thermally conductive filler layer to obtain a phthalonitrile-based core-shell composite material having one thermally conductive filler layer;

or sequentially coating the surface of the phthalonitrile-based core-shell composite material having one thermally conductive filler with the phthalonitrile-based resin layer and the second thermally conductive filler layer to obtain a phthalonitrile-based core-shell composite material having two thermally conductive filler layers;

or, likewise, preparing a phthalonitrile-based core-shell composite material having three or more thermally conductive filler layers.

In a specific embodiment, the method for preparing the phthalonitrile-based core-shell composite material comprises the following steps:

(1) dissolving a phthalonitrile resin in an organic solvent, adding a phthalonitrile-based microsphere, removing the organic solvent to enable the phthalonitrile resin to completely cover the phthalonitrile-based microsphere, thus obtaining a phthalonitrile-based microsphere coated with phthalonitrile resin; and (2) heating and mixing a first thermally conductive filler and the phthalonitrile-based microsphere covered with phthalonitrile resin obtained in the step (1) until the first thermally conductive filler is completely attached to the surface of the phthalonitrile-based microsphere coated with phthalonitrile resin, and performing pre-curing to obtain a single-layer thermally conductive filler @ phthalonitrile-based composite material.

Further, the method may further comprises the following steps:

(3) dissolving a phthalonitrile resin in an organic solvent, adding the single-layer thermally conductive filler @ phthalonitrile-based composite material obtained in the step (2), removing the organic solvent to enable the phthalonitrile resin to completely cover the single-layer thermally conductive filler @ phthalonitrile-based composite material, thus obtaining a single-layer thermally conductive filler @ phthalonitrile-based composite material coated with phthalonitrile resin; and (4) heating and mixing a second thermally conductive filler and the single-layer thermally conductive filler @ phthalonitrile-based composite material coated with phthalonitrile resin obtained in the step (3) until the second thermally conductive filler is completely attached to the surface of the single-layer thermally conductive filler @ phthalonitrile-based composite material coated with phthalonitrile resin, and performing pre-curing to obtain a phthalonitrile-based core-shell composite material having two thermally conductive filler layers.

Further, the steps (3) and (4) are repeated to obtain a phthalonitrile-based core-shell composite material having three or more thermally conductive filler layers.

According to an embodiment of the present disclosure, in the step (1) or the step (3), the phthalonitrile resin has the meaning as described above. The phthalonitrile resin is solid at normal temperature, and serves as an adhesive by changing reaction conditions for bonding a thermally conductive filler and a phthalonitrile-based microsphere.

According to an embodiment of the present disclosure, in the step (1) or the step (3), the organic solvent is selected from at least one of ethanol, acetone, n-propanol, dimethylformamide and the like, and illustratively acetone.

According to an embodiment of the present disclosure, in the step (1) or the step (3), the mass of the organic solvent is 1-10 times, for example, 3 times, 4 times, 5 times, 6 times, 7 times or 8 times the mass of the phthalonitrile resin.

According to an embodiment of the present disclosure, in the step (1), the phthalonitrile-based microsphere has the meaning as described above.

According to an embodiment of the present disclosure, in the step (1), a volume ratio of the phthalonitrile resin to the phthalonitrile-based microsphere is 1:(5-20), preferably 1:(8-15), and illustratively 1:10, 1:12 or 1:15.

According to an embodiment of the present disclosure, in the step (1) or the step (3), the method for removing the organic solvent is a conventional method for removing the organic solvent known to those skilled in the art, such as rotary evaporation to remove the organic solvent. Illustratively, the organic solvent is removed by rotary evaporation at a temperature of 70-90° C.

According to an embodiment of the present disclosure, in the step (1), the phthalonitrile-based microsphere coated with phthalonitrile resin has a core-shell structure, wherein the shell layer is the phthalonitrile resin, and the inner core is the phthalonitrile-based microsphere.

According to an embodiment of the present disclosure, in the step (2) or the step (4), a purpose of the heating is to allow the solid phthalonitrile resin on the surface of the phthalonitrile-based microsphere coated with phthalonitrile resin to be heated to the melting point and become a liquid with a certain viscosity. The heating is performed at a temperature of 130-200° C., for example, 150-160° C.

According to an embodiment of the present disclosure, in the step (2) or the step (4), the mixing is achieved by stirring, for example, by stirring for 20-60 min, preferably 30-50 min, and illustratively 30 min, 40 min or 50 min.

According to an embodiment of the present disclosure, in the step (2) or the step (4), a purpose of the pre-curing is to slightly cure the phthalonitrile resin served as an adhesive between the thermally conductive filler shell layer and the inner core to form a phthalonitrile resin layer and thus to prevent the core-shell particles from being dissolved by a solvent in the subsequent processing.

According to an embodiment of the present disclosure, in the step (3), a mass ratio of the phthalonitrile resin to the single-layer thermally conductive filler @ phthalonitrile-based composite material is 1:(5-20), preferably 1:(8-15), and illustratively 1:10, 1:12 or 1:15.

The present disclosure further provides a phthalonitrile-based core-shell composite material prepared by the method described above.

[Use of Phthalonitrile-Based Composite Material Having Core-Shell Structure]

Provided is use of the phthalonitrile-based composite material having the core-shell structure described above for preparing a phthalonitrile-based composite material with a three-dimensional continuous thermally conductive network structure.

[Phthalonitrile-Based Composite Material with Three-Dimensional Continuous Thermally Conductive Network Structure]

Provided is the phthalonitrile-based composite material with the three-dimensional continuous thermally conductive network structure described above, which is prepared from the phthalonitrile-based composite material having the core-shell structure described above.

According to an embodiment of the present disclosure, in the phthalonitrile-based composite material with the three-dimensional continuous thermally conductive network structure, the thermally conductive filler is tightly combined with the phthalonitrile resin without obvious pores, preferably with a porosity of less than 2.0%, for example, less than 1.5%.

According to an embodiment of the present disclosure, the thermally conductive filler is mutually connected in the phthalonitrile-based composite material with the three-dimensional continuous thermally conductive network structure to form a thermally conductive path.

Figure 8:
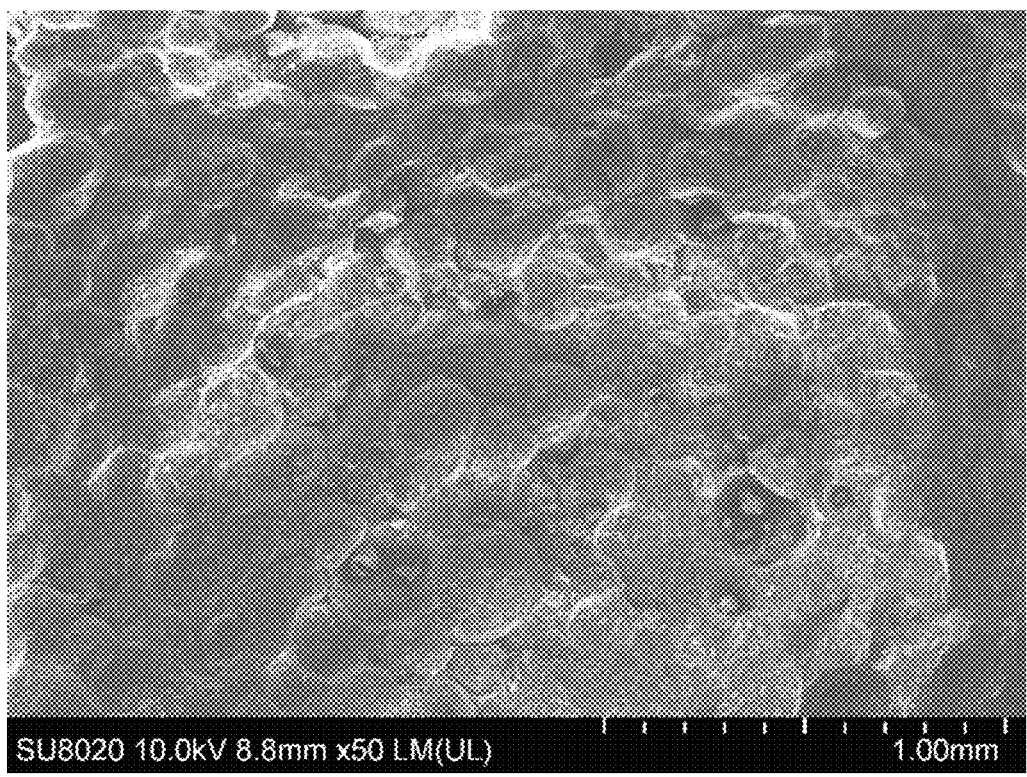
FIG. 8 shows a cross-sectional scanning electron microscopy (SEM) image of the phthalonitrile-based composite material with the three-dimensional continuous thermally conductive network structure with a boron nitride volume fraction of 20% prepared in Example B1.

According to an embodiment of the present disclosure, the phthalonitrile-based composite material with the three-dimensional continuous thermally conductive network structure has a cross-sectional topography substantially as shown in FIG. 8.

According to an embodiment of the present disclosure, the phthalonitrile-based composite material with the three-dimensional continuous thermally conductive network structure has the properties of being highly thermally conductive and providing electrical insulation. For example, the phthalonitrile-based composite material with the three-dimensional continuous thermally conductive network structure has a coefficient of thermal conductivity of 2.2-5.0 W·m$^{-1}$·K$^{-1}$, and has a volume resistivity of greater than $10^{11}$ Ω·cm, for example, between $10^{12}$ Ω·cm and $10^{13}$ Ω·cm.

Preferably, when the volume fraction of the thermally conductive filler in the phthalonitrile-based composite material with the three-dimensional continuous thermally conductive network structure is 10-40%, the phthalonitrile-based composite material with the three-dimensional continuous thermally conductive network structure has a coefficient of thermal conductivity of 2.47-4.88 W·m$^{-1}$·K$^{-1}$, and has a volume resistivity of greater than $10^{11}$ Ω·cm, preferably between $10^{12}$ Ω·cm and $10^{13}$ Ω·cm.

[Method for Preparing Phthalonitrile-Based Composite Material with Three-Dimensional Continuous Thermally Conductive Network Structure]

The present disclosure further provides a method for preparing the phthalonitrile-based composite material with the three-dimensional continuous thermally conductive network structure described above, which comprises the following step: allowing the phthalonitrile-based composite material with the three-dimensional continuous thermally conductive network structure to be prepared from a starting material comprising the phthalonitrile-based composite material having the core-shell structure.

Preferably, the phthalonitrile-based composite material with the three-dimensional continuous thermally conductive network structure is obtained from the phthalonitrile-based composite material having the core-shell structure described above by a hot-pressing reaction.

According to an embodiment of the present disclosure, the preparation method comprises the following steps:

(S1) pouring the phthalonitrile-based composite material having the core-shell structure into a mold, performing hot-pressing curing, cooling and demolding to obtain a block; and (S2) performing post-curing under normal pressure on the block obtained in the step (S1) to obtain the phthalonitrile-based composite material with the three-dimensional continuous thermally conductive network structure.

According to an embodiment of the present disclosure, in the step (S1), the hot-pressing curing is performed in stages; for example, in 1-3 stages, preferably in 2 stages. The hot-pressing curing in each stage is performed at a temperature of 260-315° C., preferably 280-315° C., and illustratively 280° C. or 315° C. Preferably, the curing in the latter stage is performed at a temperature higher than that in the previous stage. The time for the hot-pressing curing in each stage is identical or different and is, for example, 1-3 h, preferably 1.5-2.5 h, and illustratively 1.5 h, 2 h or 2.5 h. Illustratively, the hot-pressing curing is performed in two stages, and is performed at 280° C. for 2 h in the first stage and at 315° C. for 3 h in the second stage.

According to an embodiment of the present disclosure, in the step (S1), the hot-pressing curing is performed under a pressure of 5-20 MPa, preferably 8-15 MPa, and illustratively 8 MPa, 10 MPa, 12 MPa or 15 MPa.

Illustratively, under a pressure of 15 MPa, the hot-pressing curing is performed first at 280° C. for 2 h and then at 315° C. for 3 h.

According to an embodiment of the present disclosure, the mold is preheated before the phthalonitrile-based core-shell composite material is poured into the mold.

According to an embodiment of the present disclosure, in the step (S1), the cooling is natural cooling to room temperature.

According to an embodiment of the present disclosure, in the step (S2), the post-curing under normal pressure is performed in stages, for example, in 1-3 stages, preferably in 2 stages. The post-curing under normal pressure in each stage is performed at a temperature of 315-400° C., preferably 315-375° C., and illustratively 315° C., 330° C., 350° C. or 375° C. Preferably, the curing in the latter stage is performed at a temperature higher than that in the previous stage. The time for the post-curing under normal pressure in each stage is identical or different, and is selected from 2-6 h, for example, 2 h, 2.5 h, 3 h, 3.5 h, 4 h, 4.5 h, 5 h, 5.5 h or 6 h. Illustratively, under normal pressure, the post-curing is performed first at 315° C. for 2 h and then at 375° C. for 5 h.

The present disclosure further provides a phthalonitrile-based composite material with a three-dimensional continuous thermally conductive network structure prepared by the method described above.

[Use of Phthalonitrile-Based Composite Material with Three-Dimensional Continuous Thermally Conductive Network Structure]

The present disclosure further provides use of the phthalonitrile-based composite material having the core-shell structure and/or the phthalonitrile-based composite material with the three-dimensional continuous thermally conductive network structure in the field of thermal conduction; preferably, the phthalonitrile-based composite material having the core-shell structure and/or the phthalonitrile-based composite material with the three-dimensional continuous thermally conductive network structure are applied in fields that demand thermal conduction and/or electrical insulation, such as in the fields of electronics, communications, new energy, aerospace and the like.

In the present application, the unit "hour" has the same meaning as "h", and the unit "minute" has the same meaning as "min".

The technical scheme of the present disclosure will be further illustrated in detail with reference to the following specific examples. It should be understood that the following embodiments are merely exemplary illustration and explanation of the present disclosure, and should not be construed as limiting the protection scope of the present disclosure. All techniques implemented based on the content of the present disclosure described above are encompassed within the protection scope of the present disclosure.

Unless otherwise stated, the starting materials and reagents used in the following examples are all commercially available products or can be prepared by known methods.

Preparation Example A1

Aluminum oxide @ graphite shell-core composite particles were prepared as follows.
(1) 10 g of graphite and 0.4 g of sodium dodecyl sulfate were dispersed in 300 mL of deionized water and ultrasonicated in an ultrasonic cleaner at 80° C. and 100 W for 0.5 hours to obtain a stable and homogeneous mixed liquid.
(2) The mixed liquid described above was mechanically stirred at 80° C. for 2 hours. 15.0 g of aluminum nitrate nonahydrate and 4.8 g of sodium hydroxide were each weighed out to formulate 20 mL aqueous solutions, which were then slowly added dropwise to the mixed liquid described above simultaneously, and the pH value was maintained at 6-7. The reaction was continued under stirring for 2 hours, and suction filtration was performed. The filter residue was washed with ethanol 3-5 times, and then dried in a vacuum oven at 100° C. for 12 hours to obtain aluminum hydroxide @ graphite particles. The obtained aluminum hydroxide @ graphite particles were calcined in a tubular furnace at 600° C. for 3 hours to obtain aluminum oxide @ graphite shell-core composite particles as a product.

Figure 1:
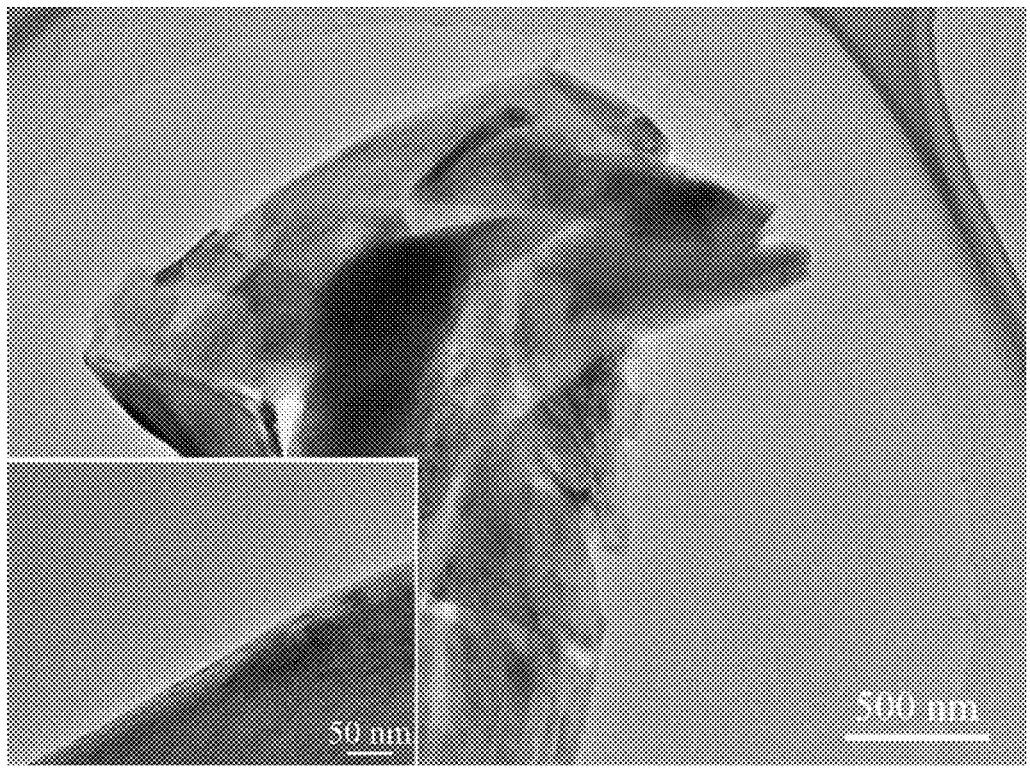
FIG. 1 shows a transmission electron microscopy (TEM) image of graphite.

FIG. 1 shows a transmission electron microscopy (TEM) image of graphite, and FIG. 2 shows a transmission electron microscopy (TEM) image of the prepared aluminum oxide @ graphite core-shell composite particles. By comparison, it can be seen that aluminum oxide successfully coated the surface of graphite, and the aluminum oxide @ graphite shell-core composite particles were successfully prepared.

Figure 3:
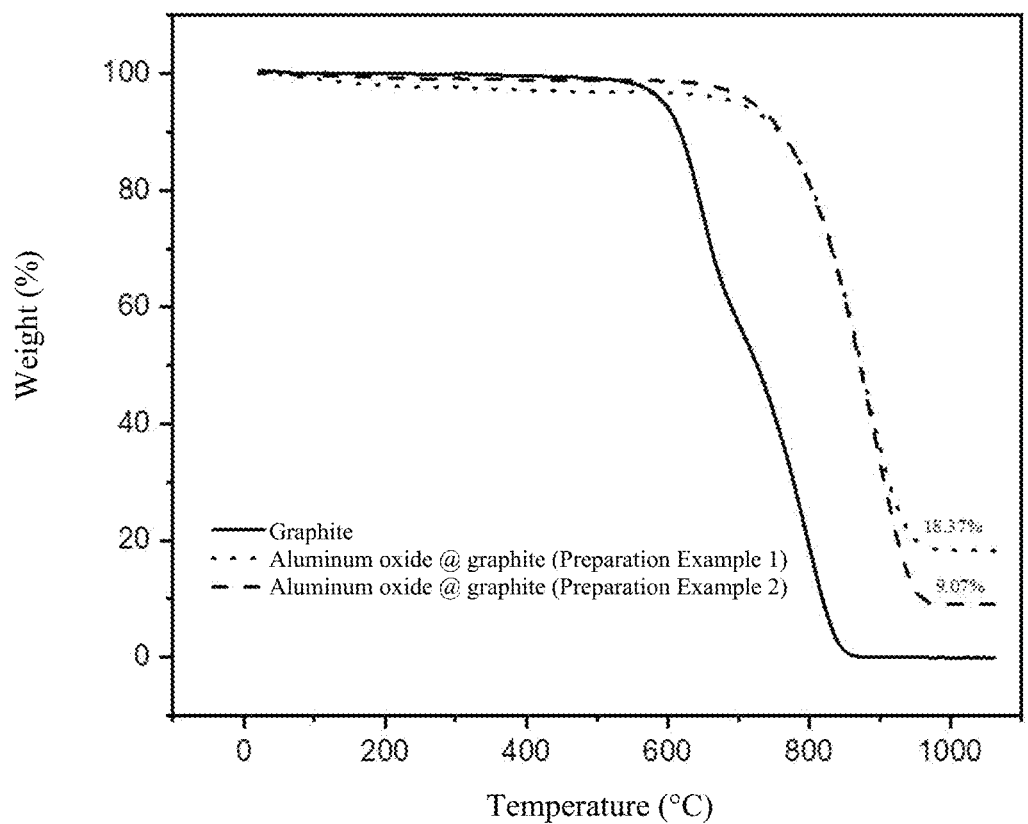
FIG. 3 shows a thermogravimetric analysis (TGA) diagram of the aluminum oxide @ graphite core-shell composite particles prepared in Preparation Example A1 and Preparation Example A2, and graphite under air atmosphere.

FIG. 3 shows a thermogravimetric analysis (TGA) diagram of the prepared aluminum oxide @ graphite core-shell composite particles under air atmosphere, from which it can be concluded that the aluminum oxide shell layer accounted for 18.37% by mass of the aluminum oxide @ graphite core-shell composite particle.

Preparation Example A2

Aluminum oxide @ graphite shell-core composite particles were prepared as follows.
(1) 10 g of graphite and 0.4 g of sodium dodecyl sulfate were dispersed in 300 mL of deionized water and ultrasonicated in an ultrasonic cleaner at 80° C. and 100 W for 0.5 hours to obtain a stable and homogeneous mixed liquid.
(2) The mixed liquid described above was mechanically stirred at 80° C. for 2 hours. 7.5 g of aluminum nitrate nonahydrate and 2.4 g of sodium hydroxide were each weighed out to formulate 20 mL aqueous solutions, which were then slowly added dropwise to the mixed liquid described above simultaneously, and the pH value was maintained at 6-7. The reaction was continued under stirring for 2 hours, and suction filtration was performed. The filter residue was washed with ethanol 3-5 times, and then dried in a vacuum oven at 100° C. for 12 hours to obtain aluminum hydroxide @ graphite particles. The obtained aluminum hydroxide @ graphite particles were calcined in a tubular furnace at 600° C. for 3 hours to obtain aluminum oxide @ graphite shell-core composite particles as a product.

FIG. 3 shows a thermogravimetric analysis (TGA) diagram of the prepared aluminum oxide @ graphite core-shell composite particles under air atmosphere, from which it can be concluded that the aluminum oxide shell layer accounted for 9.07% by mass of the aluminum oxide @ graphite core-shell composite particle.

Preparation Example A3

Aluminum oxide @ graphite shell-core composite particles were prepared as follows.
(1) 10 g of graphite and 0.4 g of sodium dodecyl sulfate were dispersed in 300 mL of deionized water and ultrasonicated in an ultrasonic cleaner at 80° C. and 100 W for 0.5 hours to obtain a stable and homogeneous mixed liquid.
(2) The mixed liquid described above was mechanically stirred at 80° C. for 2 hours. 20 g of aluminum nitrate nonahydrate and 6.4 g of sodium hydroxide were each weighed out to formulate 20 mL aqueous solutions, which were then slowly added dropwise to the mixed liquid described above simultaneously, and the pH value was maintained at 6-7. The reaction was continued under stirring for 2 hours, and suction filtration was performed. The filter residue was washed with ethanol 3-5 times, and then dried in a vacuum oven at 100° C. for 12 hours to obtain aluminum hydroxide @ graphite particles. The obtained aluminum hydroxide @ graphite particles were calcined in a tubular furnace at 600° C. for 3 hours to obtain aluminum oxide @ graphite shell-core composite particles as a product. The aluminum oxide shell layer accounted for about 24% by mass of the aluminum oxide @ graphite core-shell composite particle.

Example A1

In this example, a thermally conductive and insulating phthalonitrile-based composite material (the aluminum oxide @ graphite shell-core composite particles accounted for about 5% by the mass of the composite material) was prepared as follows.

8.0 g of phthalonitrile monomer (with a structure as shown in formula (2)) was melted by heat, and then added with 0.4 g of 4-amino-(3,4-dicyanophenoxy)benzene as a solidifier. The resulting mixture was mechanically stirred homogeneously, then added with 0.44 g of the aluminum oxide @ graphite shell-core composite particles prepared in Preparation Example 1, and mixed homogeneously by mechanically stirring for 20 minutes to obtain a mixture.

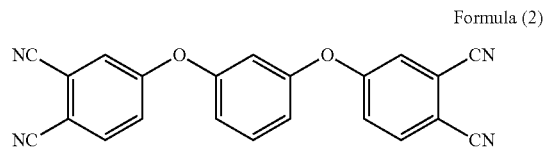 [SMILES: N#Cc1ccc(Oc2cccc(Oc3ccc(C#N)c(C#N)c3)c2)cc1C#N]

Formula (2)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain the thermally conductive and insulating phthalonitrile-based composite material.

Example A2

In this example, a thermally conductive and insulating phthalonitrile-based composite material (the aluminum oxide @ graphite shell-core composite particles accounted for about 10% by the mass of the composite material) was prepared as follows.

8.0 g of phthalonitrile monomer (with a structure as shown in formula (2)) was melted by heat, and then added with 0.4 g of 4-amino-(3,4-dicyanophenoxy)benzene as a solidifier. The resulting mixture was mechanically stirred homogeneously, then added with 0.93 g of the aluminum oxide @ graphite shell-core composite particles prepared in Preparation Example 1, and mixed homogeneously by mechanically stirring for 20 minutes to obtain a mixture.

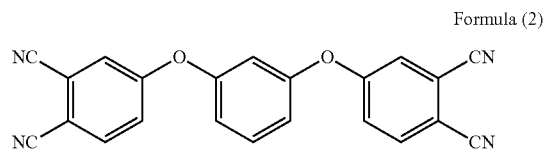 [SMILES: N#Cc1ccc(Oc2cccc(Oc3ccc(C#N)c(C#N)c3)c2)cc1C#N]

Formula (2)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain the thermally conductive and insulating phthalonitrile-based composite material.

Example A3

In this example, a thermally conductive and insulating phthalonitrile-based composite material (the aluminum oxide @ graphite shell-core composite particles accounted for about 15% by the mass of the composite material) was prepared as follows.

8.0 g of phthalonitrile monomer (with a structure as shown in formula (3)) was melted by heat, and then added with 0.4 g of 4-amino-(3,4-dicyanophenoxy)benzene as a solidifier. The resulting mixture was mechanically stirred homogeneously, then added with 1.48 g of the aluminum oxide @ graphite composite particles prepared in Preparation Example 1, and mixed homogeneously by mechanically stirring for 20 minutes to obtain a mixture.

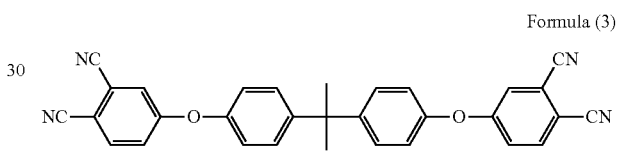

Formula (3)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain the thermally conductive and insulating phthalonitrile-based composite material.

FIG. 4 shows a cross-sectional scanning electron microscopy (SEM) image of the prepared phthalonitrile composite material, and it can be seen that: the aluminum oxide @ graphite shell-core composite particles were uniformly distributed in the resin without agglomeration. In addition, the hot-pressing process enabled the aluminum oxide @ graphite particles to be tightly combined with the phthalonitrile without obvious pores (with a porosity of less than 2.5%). The good interfacial adhesion enabled the heat between the particles and the resin to be effectively conducted, reducing the interfacial thermal resistance. The aluminum oxide @ graphite particles were mutually overlapped, and a corresponding thermally conductive path was effectively constructed.

Example A4

In this example, a thermally conductive and insulating phthalonitrile-based composite material (the aluminum oxide @ graphite shell-core composite particles accounted for about 20% by the mass of the composite material) was prepared as follows.

8.0 g of phthalonitrile monomer (with a structure as shown in formula (3)) was melted by heat, and then added with 0.4 g of 4-amino-(3,4-dicyanophenoxy)benzene as a solidifier. The resulting mixture was mechanically stirred homogeneously, then added with 2.1 g of the aluminum oxide @ graphite shell-core composite particles prepared in Preparation Example 1, and mixed homogeneously by mechanically stirring for 20 minutes to obtain a mixture.

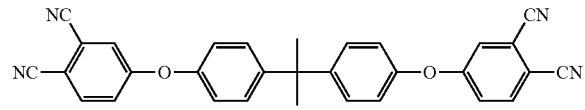

Formula (3)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain the thermally conductive and insulating phthalonitrile-based composite material.

Comparative Example A1

No filler was added. 8.0 g of phthalonitrile monomer (with a structure as shown in formula (2)) was melted by heat, and then added with 0.4 g of 4-amino-(3,4-dicyanophenoxy)benzene as a solidifier. The resulting mixture was mixed homogeneously by mechanically stirring for 20 minutes.

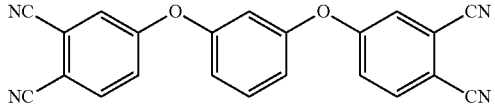

Formula (2)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain a phthalonitrile resin.

Comparative Example A2

8.0 g of phthalonitrile monomer (with a structure as shown in formula (2)) was melted by heat, and then added with 0.4 g of 4-amino-(3,4-dicyanophenoxy)benzene as a solidifier. The resulting mixture was mechanically stirred homogeneously, then added with 0.44 g of graphite (graphite accounted for about 5% by mass of the composite material), and mixed homogeneously by mechanically stirring for 20 minutes to obtain a mixture.

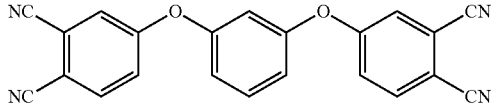

Formula (2)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain a phthalonitrile-based composite material.

Comparative Example A3

8.0 g of phthalonitrile monomer (with a structure as shown in formula (3)) was melted by heat, and then added with 0.4 g of 4-amino-(3,4-dicyanophenoxy)benzene as a solidifier. The resulting mixture was mechanically stirred homogeneously, then added with 1.48 g of graphite (graphite accounted for about 15% by mass of the composite material), and mixed homogeneously by mechanically stirring for 20 minutes to obtain a mixture.

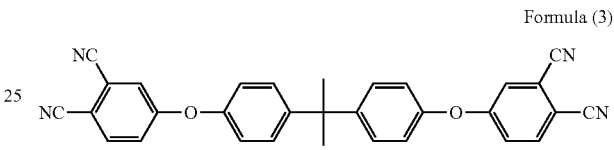

Formula (3)

The mixture was poured into a preheated mold and pre-cured under normal pressure at 200° C. for 1 hour. Then under a pressure of 10 MPa, the mixture was cured at 230° C. for 2 hours, then at 250° C. for 2 hours, and finally at 280° C. for 2 hours. The resulting cured mixture was naturally cooled to room temperature, demolded, cured under normal pressure at 315° C. for 5 hours and then at 375° C. for 5 hours to obtain a phthalonitrile composite material.

The phthalonitrile-based composite materials prepared in the examples and comparative examples described above were tested by the following test methods, and the specific test results are shown in Table 1.

(1) Coefficient of Thermal Conductivity Testing

The composite materials were tested for coefficient of thermal conductivity by transient plane thermal source method (Hot Disk).

(2) Volume Resistivity Testing

The composite materials were tested at a voltage of 500 V for volume resistivity using a PC68 digital high resistance meter.

(3) Dynamic Mechanical Analysis (DMA)

The composite materials were tested at a temperature of 25-500° C. at a frequency of 1 Hz in a nitrogen atmosphere for glass transition temperature using Netzsch 242c.

TABLE 1

Properties of phthalonitrile-based composite materials prepared in examples and comparative examples

| | Filling amount of filler (wt %) | Coefficient of thermal conductivity ($W \cdot m^{-1} \cdot K^{-1}$) | Volume resistivity ($\Omega \cdot cm$) | Glass transition temperature (° C.) |
|---|---|---|---|---|
| Example A1 | 5 | 0.337 | $6.57 \times 10^{12}$ | 457.7 |
| Example A2 | 10 | 0.431 | $3.92 \times 10^{12}$ | 455.3 |
| Example A3 | 15 | 0.466 | $6.65 \times 10^{11}$ | 459.1 |
| Example A4 | 20 | 0.663 | $1.33 \times 10^{10}$ | 457.3 |
| Comparative Example A1 | 0 | 0.214 | $2.30 \times 10^{13}$ | 460.1 |

TABLE 1-continued

Properties of phthalonitrile-based composite materials prepared in examples and comparative examples

| | Filling amount of filler (wt %) | Coefficient of thermal conductivity (W · m⁻¹ · K⁻¹) | Volume resistivity (Ω · cm) | Glass transition temperature (° C.) |
|---|---|---|---|---|
| Comparative Example A2 | 5 | 0.355 | 9.87 × 10⁵ | 455.0 |
| Comparative Example A3 | 15 | 0.522 | 4.83 × 10⁴ | 457.9 |

According to the comparison between Examples A1-A4 and Comparative Example A1 in Table 1, it can be concluded that as the content of the aluminum oxide @ graphite composite particles increases, the thermally conductive filler is mutually overlapped to form a thermally conductive network, effectively increasing the coefficient of thermal conductivity of the composite material and allowing for better heat conduction. The volume resistivity of the corresponding composite material decreases slightly, but still remains at a high level.

According to the comparison between Comparative Example A1, Comparative Example A2 and Comparative Example A3 in Table 1, it can be concluded that the coefficient of thermal conductivity and the electrical conductivity of the composite material filled with untreated graphite are both significantly increased, and this composite material with untreated graphite filler has been applied in the fields of thermal conduction and electrical conduction through polymer-based composite materials. However, the high electrical conductivity of the material filled with untreated graphite cannot meet the insulation requirement.

According to the comparison between Example A1 and Comparative Example A2 in Table 1, it can be concluded that the coefficient of thermal conductivity of the composite material filled with aluminum oxide @ graphite particles is comparable to that of the composite material filled with the same content of untreated graphite, but the volume resistivity is several orders of magnitude higher. The high thermal conductivity of carbon material graphite and the insulation property of aluminum oxide are combined by the combination of aluminum oxide and graphite, and thus good results are achieved.

According to the comparison between Examples A1-A4 and Comparative Example A1 in Table 1, it can be concluded that the glass transition temperature of the composite material filled with aluminum oxide @ graphite particles fluctuates between 455° C. and 460° C. without significant decrease as compared to that of pure phthalonitrile resin, and that the glass transition temperature of the composite material filled with aluminum oxide @ graphite particles is still high (Tg>450° C.). Therefore, the phthalonitrile composite material filled with aluminum oxide @ graphite particles has good heat resistance.

In conclusion, the aluminum oxide @ graphite composite particles prepared by the simple and feasible method of the present disclosure have the advantages of being produced in high yield at low cost and having good properties. The composite material prepared by blending the aluminum oxide @ graphite composite particles as a thermally conductive filler with phthalonitrile resin has high heat conductivity, and meanwhile, the material retains the good electrical insulation property and heat resistance. The present disclosure provides a new idea for use of carbon materials in the fields of thermal conduction and insulation through composite materials.

The phthalonitrile microspheres used in Preparation Examples B1-B3 described below were prepared as follows.

20 g of phthalonitrile resin (which was prepared by stirring 18 g of phthalonitrile monomer of formula (2) with 2 g of 4-amino-(3,4-dicyanophenoxy)benzene as a solidifier at 160° C. for 20 minutes) was dissolved in 100 mL of acetone solution. The resulting solution was stirred homogeneously, then added with 4 g of polymethylmethacrylate (PMMA), heated and stirred until the solvent was completely volatilized to obtain a homogeneous mixture.

Formula (2)

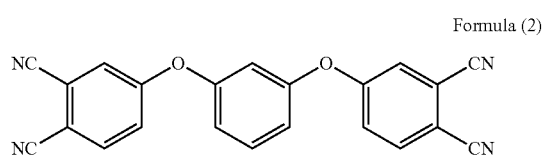 [SMILES: N#Cc1ccc(Oc2cccc(Oc3ccc(C#N)c(C#N)c3)c2)cc1C#N]

The obtained mixture was cured at 170° C. for 1 hour, then at 200° C. for 1 hour, and finally at 250° C. for 1 hour. Then the mixture was washed with acetone to remove polymethylmethacrylate (PMMA) to obtain phthalonitrile-based microspheres.

Figure 5:
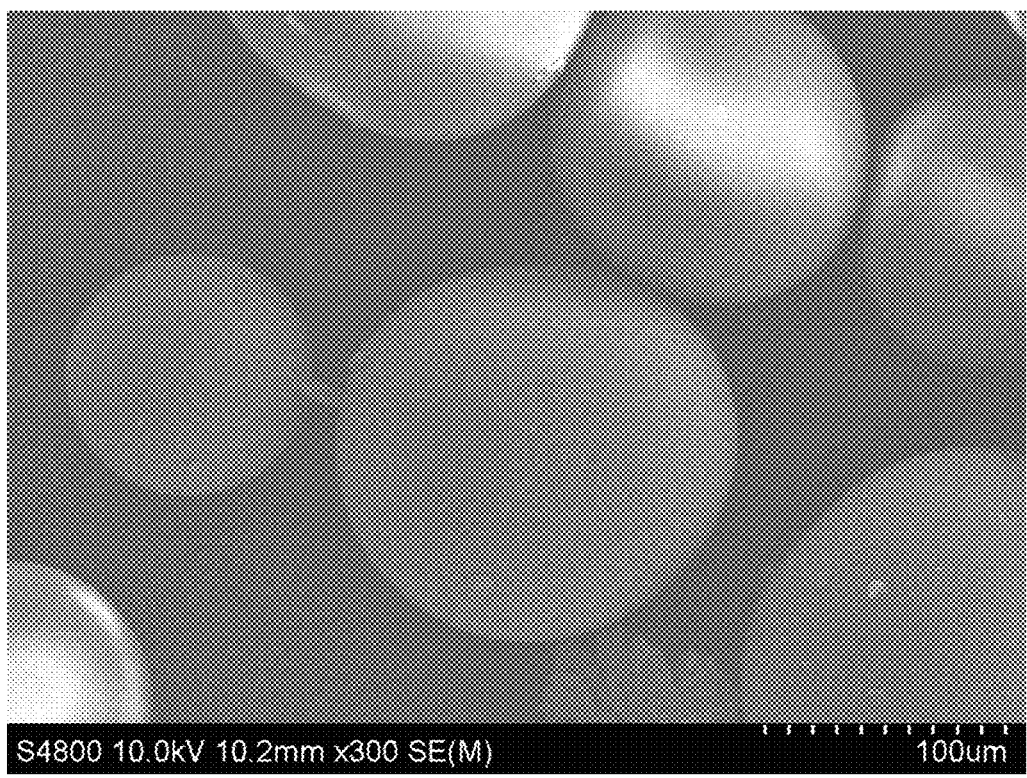
FIG. 5 shows a scanning electron microscopy (SEM) image of the phthalonitrile-based microspheres.
Figure 6:
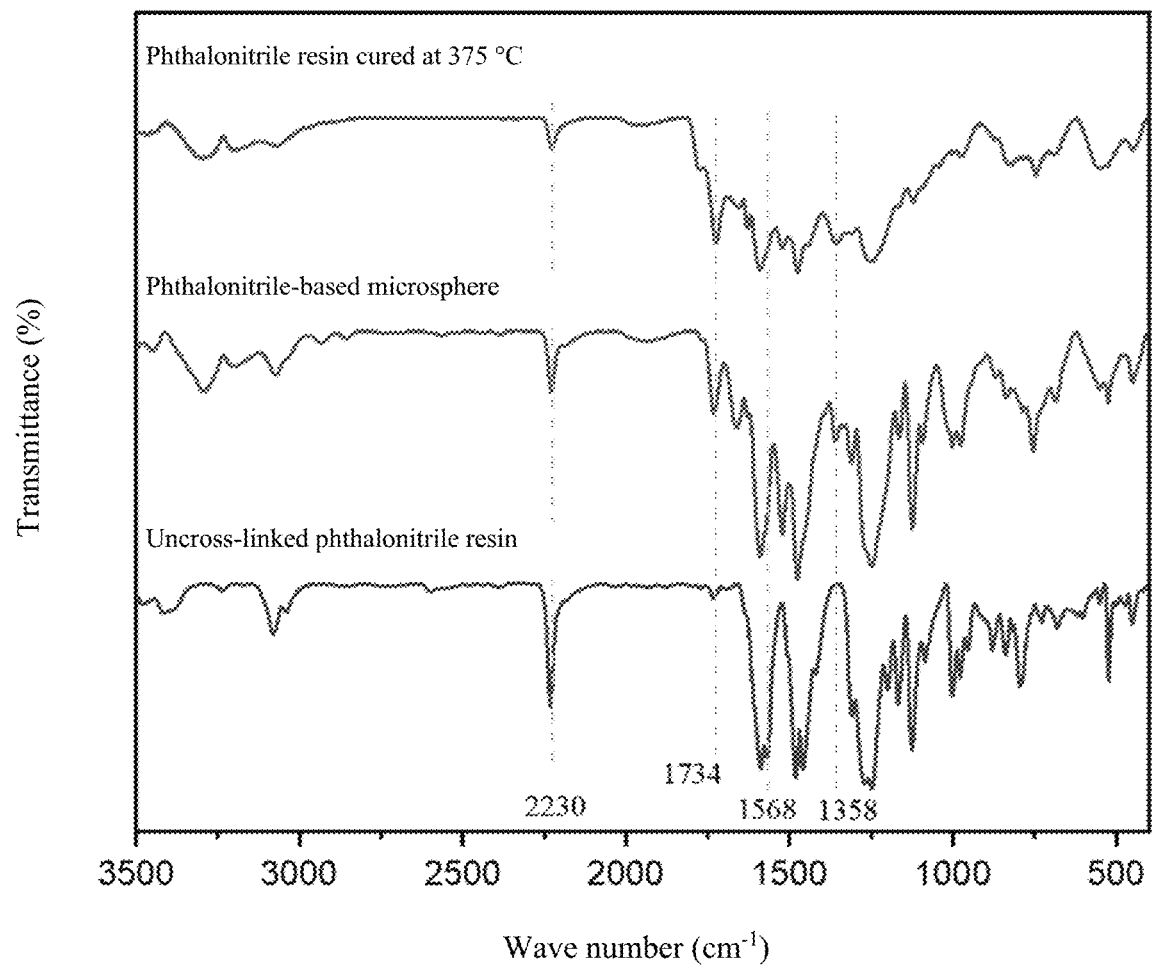
FIG. 6 shows the infrared spectrum comparison of the phthalonitrile-based microspheres, an uncross-linked phthalonitrile resin and a phthalonitrile resin cured at 375° C.

FIG. 5 shows a scanning electron microscopy (SEM) image of the phthalonitrile-based microspheres. The particle size of the phthalonitrile microspheres was uniformly distributed between 80 μm and 190 μm, and the Dv (50) was 129 μm. The cross-linking density of the phthalonitrile-based microspheres was shown by infrared spectrum, and FIG. 6 shows a comparison between the infrared spectra of the phthalonitrile-based microspheres, an uncross-linked phthalonitrile resin (comprising the phthalonitrile monomer of formula (2)) and a phthalonitrile resin (comprising the phthalonitrile monomer of formula (2)) cured at 375° C. The maximum curing temperature of the phthalonitrile-based microspheres was 250° C. The infrared spectrum of the phthalonitrile-based microspheres was similar to that of the uncross-linked phthalonitrile resin, and had a higher C≡N peak intensity at 2230 cm⁻¹ as compared to that of the phthalonitrile resin cured at 375° C., indicating that there were still many unreacted cyano groups in the phthalonitrile-based microspheres, which were incompletely cured and could be remelted at high temperature.

In the Preparation Examples described below, the amounts of the starting materials, except for the solvent, were given in the actual mass used, and those skilled in the art can calculate the volume fraction of each starting material in the composite material according to the following formula: v (volume)=m (mass)/ρ (density). The phthalonitrile resin had a density of 1.38 g/cm³, aluminum oxide had a density of 3.5 g/cm³, boron nitride had a density of 2.25 g/cm³, and graphite had a density of 2.25 g/cm³.

Preparation Example B1

A single-layer boron nitride @ phthalonitrile-based composite material (boron nitride accounted for about 20% by volume of the single-layer boron nitride @ phthalonitrile-based composite material) was prepared as follows.

(1) 1 g of phthalonitrile resin (which was prepared by stirring 0.95 g of phthalonitrile monomer of formula (2) with 0.05 g of 4-amino-(3,4-dicyanophenoxy)benzene as a solidifier at 160° C. for 20 minutes) was dissolved in 50 mL of acetone solution. The resulting solution was stirred homogeneously, then added with 10 g of phthalonitrile-based microspheres, and subjected to rotary evaporation until the solvent was completely volatilized to obtain phthalonitrile-based microspheres coated with phthalonitrile resin.

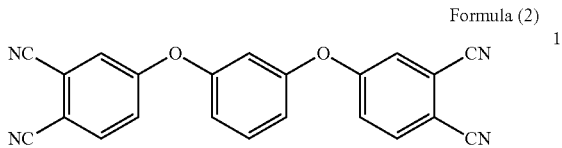

Formula (2)

(2) 4.5 g of boron nitride was heated to 160° C., and then added with the phthalonitrile-based microspheres coated with phthalonitrile resin described above. The resulting mixture was stirred until all the boron nitride was completely attached to the surfaces of the phthalonitrile-based microspheres coated with phthalonitrile resin, and then pre-cured at 200° C. for 2 hours to obtain the single-layer boron nitride @ phthalonitrile-based composite material in which the boron nitride accounted for 20% by volume of the composite material.

FIG. 7 shows a scanning electron microscopy (SEM) image of the single-layer boron nitride @ phthalonitrile-based composite material with a boron nitride volume fraction of 20%. By comparing with FIG. 5, it can be concluded that boron nitride successfully coated the surfaces of the phthalonitrile-based microspheres, and the single-layer boron nitride @ phthalonitrile-based composite material was successfully prepared.

Preparation Example B2

The boron nitride-graphite @ phthalonitrile composite material (boron nitride and graphite each accounted for about 20% by volume of the boron nitride-graphite @ phthalonitrile-based composite material; the inner layer was graphite, and the outer layer was boron nitride) was prepared as follows.
(1) 1 g of phthalonitrile resin (which was prepared by stirring 0.95 g of phthalonitrile monomer of formula (2) with 0.05 g of 4-amino-(3,4-dicyanophenoxy)benzene as a solidifier at 160° C. for 20 minutes) was dissolved in 50 mL of acetone solution. The resulting solution was stirred homogeneously, then added with 10 g of phthalonitrile-based microspheres, and subjected to rotary evaporation until the solvent was completely volatilized to obtain phthalonitrile-based microspheres coated with phthalonitrile resin.

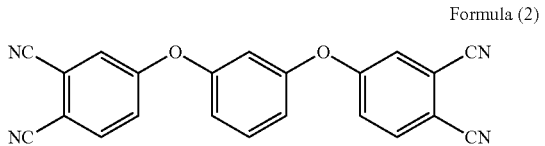 [SMILES: N#Cc1ccc(Oc2cccc(Oc3ccc(C#N)c(C#N)c3)c2)cc1C#N]

Formula (2)

(2) 6.5 g of graphite was heated to 160° C., and then added with the phthalonitrile-based microspheres coated with phthalonitrile resin described above. The resulting mixture was stirred until all the graphite was completely attached to the surfaces of the phthalonitrile-based microspheres coated with phthalonitrile resin, and then pre-cured at 200° C. for 2 hours to obtain a single-layer graphite @ phthalonitrile-based composite material.
(3) 1 g of phthalonitrile resin (which was prepared by stirring 0.95 g of phthalonitrile monomer of formula (2) with 0.05 g of 4-amino-(3,4-dicyanophenoxy)benzene as a solidifier at 160° C. for 20 minutes) was dissolved in 50 mL of acetone solution. The resulting solution was stirred homogeneously, added with the single-layer graphite @ phthalonitrile-based composite material described above, and subjected to rotary evaporation until the solvent was completely volatilized to obtain a single-layer graphite @ phthalonitrile-based composite material coated with phthalonitrile resin.
(4) 6.5 g of boron nitride was heated to 160° C., and then added with the single-layer graphite @ phthalonitrile-based composite material coated with phthalonitrile resin described above. The resulting mixture was stirred until all the boron nitride was completely attached to the surface of the single-layer graphite @ phthalonitrile-based composite material coated with phthalonitrile resin, and then pre-cured at 200° C. for 2 hours to obtain a boron nitride-graphite @ phthalonitrile-based composite material.

Preparation Example B3

A boron nitride-aluminum oxide-graphite @ phthalonitrile-based composite material (boron nitride, aluminum oxide and graphite accounted for about 20%, 10% and 10% by volume of the boron nitride-aluminum oxide-graphite @ phthalonitrile-based composite material, respectively; the inner layer was graphite, the middle layer was aluminum oxide, and the outer layer was boron nitride) was prepared as follows.
(1) 1 g of phthalonitrile resin (which was prepared by stirring 0.95 g of phthalonitrile monomer of formula (3') with 0.05 g of 4-amino-(3,4-dicyanophenoxy)benzene as a solidifier at 160° C. for 20 minutes) was dissolved in 50 mL of acetone solution. The resulting solution was stirred homogeneously, then added with 10 g of phthalonitrile-based microspheres, subjected to rotary evaporation until the solvent was completely volatilized, and then pre-cured at 200° C. for 2 hours to obtain phthalonitrile-based microspheres coated with phthalonitrile resin.

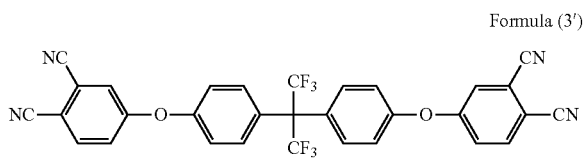

Formula (3')

(2) 3.5 g of graphite was heated to 160° C., and then added with the phthalonitrile-based microspheres coated with phthalonitrile resin described above. The resulting mixture was stirred until all the boron nitride was completely attached to the surfaces of the phthalonitrile-based microspheres coated with phthalonitrile resin, and then pre-cured at 200° C. for 2 hours to obtain a single-layer graphite @ phthalonitrile-based composite material.
(3) 1 g of phthalonitrile resin (which was prepared by stirring 0.95 g of phthalonitrile monomer of formula (3') with 0.05 g of 4-amino-(3,4-dicyanophenoxy)benzene as a solidifier at 160° C. for 20 minutes) was dissolved in 50 mL of acetone solution. The resulting solution was stirred homogeneously, then added with the single-layer graphite @ phthalonitrile-based composite material described above, and subjected to rotary evaporation until the solvent was completely volatilized to obtain a single-layer graphite @ phthalonitrile-based composite material coated with phthalonitrile resin.

(4) 5.5 g of aluminum oxide was heated to 160° C., and then added with the single-layer boron nitride @ phthalonitrile-based composite material coated with phthalonitrile resin described above. The resulting mixture was stirred until all the aluminum oxide was completely attached to the surface of the single-layer boron nitride @ phthalonitrile-based composite material coated with phthalonitrile resin, and then pre-cured at 200° C. for 2 hours to obtain an aluminum oxide-graphite @ phthalonitrile-based composite material.

(5) 1 g of phthalonitrile resin (which was prepared by stirring 0.95 g of phthalonitrile monomer of formula (3') with 0.05 g of 4-amino-(3,4-dicyanophenoxy)benzene as a solidifier at 160° C. for 20 minutes) was dissolved in 50 mL of acetone solution. The resulting solution was stirred homogeneously, then added with the single-layer graphite @ phthalonitrile-based composite material described above, and subjected to rotary evaporation until the solvent was completely volatilized to obtain an aluminum oxide-graphite @ phthalonitrile-based composite material coated with phthalonitrile resin.

(6) 7.1 g of boron nitride was heated to 160° C., and then added with the aluminum oxide-graphite @ phthalonitrile-based composite material coated with phthalonitrile resin described above. The resulting mixture was stirred until all the aluminum oxide was completely attached to the surface of the aluminum oxide-graphite @ phthalonitrile-based composite material coated with phthalonitrile resin, and then pre-cured at 200° C. for 2 hours to obtain the boron nitride-aluminum oxide-graphite @ phthalonitrile-based composite material.

Example B1

In this example, a phthalonitrile-based composite material with a three-dimensional continuous thermally conductive network structure was prepared as follows.
(1) 10.0 g of the single-layer boron nitride @ phthalonitrile-based composite material prepared in Preparation Example B1 was poured into a preheated mold, cured first at 280° C. for 2 hours and then at 315° C. for 3 hours under a pressure of 15 MPa. The resulting cured composite material was cooled and demolded to obtain a block.
(2) The block obtained in the step (1) was placed into an oven, cured first at 315° C. for 2 hours and then at 375° C. for 5 hours under normal pressure to obtain the phthalonitrile-based composite material with the three-dimensional continuous thermally conductive network structure.
FIG. 8 shows a cross-sectional scanning electron microscopy (SEM) image of the phthalonitrile-based composite material with the three-dimensional continuous thermally conductive network structure with a boron nitride volume fraction of 20%. It can be concluded that the three-dimensional continuous boron nitride thermally conductive network had been constructed.

Example B2

In this example, a phthalonitrile-based composite material with a three-dimensional continuous thermally conductive network structure was prepared as follows.
(1) 10.0 g of the boron nitride-graphite @ phthalonitrile-based composite material prepared in Preparation Example B2 was poured into a preheated mold, cured first at 280° C. for 2 hours and then at 315° C. for 3 hours under a pressure of 15 MPa. The resulting cured composite material was cooled and demolded to obtain a block.
(2) The block obtained in the step (1) was placed into an oven, cured first at 315° C. for 2 hours and then at 375° C. for 5 hours under normal pressure to obtain the phthalonitrile-based composite material with the three-dimensional continuous thermally conductive network structure.

Example B3

In this example, a phthalonitrile-based composite material with a three-dimensional continuous thermally conductive network structure was prepared as follows.
(1) 10.0 g of the boron nitride-aluminum oxide-graphite @ phthalonitrile-based composite material prepared in Preparation Example B3 was poured into a preheated mold, cured first at 280° C. for 2 hours and then at 315° C. for 3 hours under a pressure of 15 MPa. The resulting cured composite material was cooled and demolded to obtain a block.
(2) The block obtained in the step (1) was placed into an oven, cured first at 315° C. for 2 hours and then at 375° C. for 5 hours under normal pressure to obtain the phthalonitrile-based composite material with the three-dimensional continuous thermally conductive network structure.

Comparative Example B1

In this comparative example, the preparation was conducted as follows (boron nitride with a volume fraction of 20% was added in a random distribution manner). 10.0 g of phthalonitrile resin (which was prepared by stirring 9.5 g of phthalonitrile monomer of formula (2) with 0.5 g of 4-amino-(3,4-dicyanophenoxy)benzene as a solidifier at 160° C. for 20 minutes) and 4.5 g of boron nitride were dispersed in an acetone solution. The resulting mixture was heated and stirred until the solvent was completely volatilized, and then subjected to vacuum deaeration to obtain a mixture.

Formula (2)

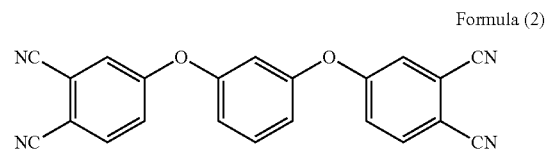 [SMILES: N#Cc1ccc(Oc2cccc(Oc3ccc(C#N)c(C#N)c3)c2)cc1C#N]

The mixture was poured into a preheated mold and pre-cured under normal pressure at 200° C. for 1 hour. Then under a pressure of 15 MPa, the mixture was cured first at 230° C. for 2 hours, then at 250° C. for 2 hours, and finally at 280° C. for 2 hours. The resulting cured mixture was naturally cooled to room temperature, demolded, cured under normal pressure first at 315° C. for 5 hours and then at 375° C. for 5 hours to obtain a phthalonitrile-based thermally conductive composite material.

Figure 9:
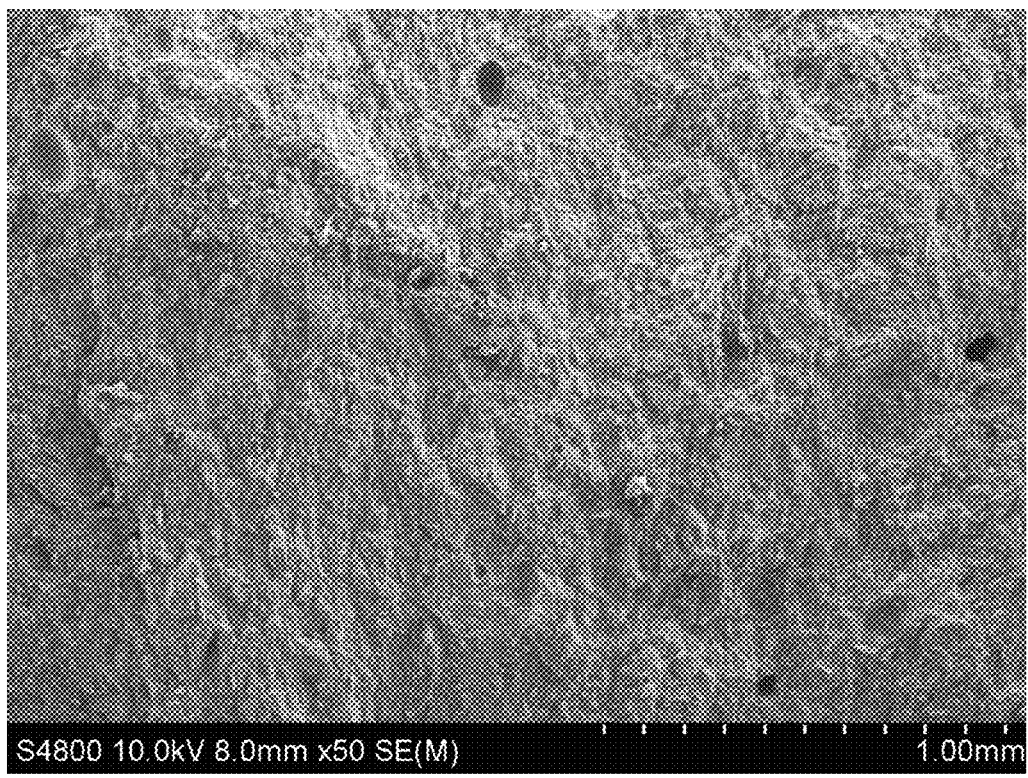
FIG. 9 shows the phthalonitrile-based thermally conductive composite material with random distribution of 20% boron nitride by volume prepared in Comparative Example B1.

FIG. 9 shows a phthalonitrile-based thermally conductive composite material with random distribution of 20% boron nitride by volume. It can be concluded that the boron nitride thermally conductive filler is disordered, and is difficult to be mutually overlapped to form a thermally conductive path.

Comparative Example B2

In this comparative example, the preparation was conducted as follows (boron nitride with a volume fraction of 20% and graphite with a volume fraction of 20% were added in a random distribution manner).

10 g of phthalonitrile resin (which was prepared by stirring 9.5 g of phthalonitrile monomer of formula (2) with 0.5 g of 4-amino-(3,4-dicyanophenoxy)benzene as a solidifier at 160° C. for 20 minutes), 6.5 g of graphite and 6.5 g of boron nitride were dispersed in an acetone solution. The resulting mixture was heated and stirred until the solvent was completely volatilized, and then subjected to vacuum deaeration to obtain a mixture.

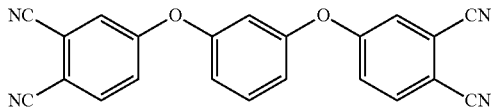

Formula (2)

The mixture was poured into a preheated mold and pre-cured under normal pressure at 200° C. for 1 hour. Then under a pressure of 15 MPa, the mixture was cured first at 230° C. for 2 hours, then at 250° C. for 2 hours, and finally at 280° C. for 2 hours. The resulting cured mixture was naturally cooled to room temperature, demolded, cured under normal pressure first at 315° C. for 5 hours and then at 375° C. for 5 hours to obtain a phthalonitrile-based thermally conductive composite material.

Comparative Example B3

In this comparative example, the preparation was conducted as follows (boron nitride with a volume fraction of 20%, aluminum oxide with a volume fraction of 10% and graphite with a volume fraction of 10% were added in a random distribution manner).

10 g of phthalonitrile resin (which was prepared by stirring 9.5 g of phthalonitrile monomer of formula (3') with 0.5 g of 4-amino-(3,4-dicyanophenoxy)benzene as a solidifier at 160° C. for 20 minutes), 3.5 g of graphite, 5.5 g of aluminum oxide and 7.1 g of boron nitride were dispersed in an acetone solution. The resulting mixture was heated and stirred until the solvent was completely volatilized, and then subjected to vacuum deaeration to obtain a mixture.

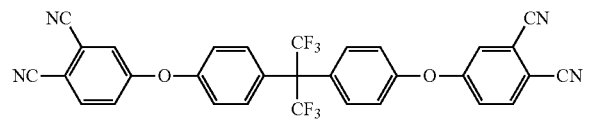

Formula (3')

The mixture was poured into a preheated mold and pre-cured under normal pressure at 200° C. for 1 hour. Then under a pressure of 15 MPa, the mixture was cured first at 230° C. for 2 hours, then at 250° C. for 2 hours, and finally at 280° C. for 2 hours. The resulting cured mixture was naturally cooled to room temperature, demolded, cured under normal pressure first at 315° C. for 5 hours and then at 375° C. for 5 hours to obtain a phthalonitrile-based thermally conductive composite material.

Comparative Example B4

In this comparative example, the preparation was conducted as follows (no filler was added).

(1) 10 g of phthalonitrile resin (which was prepared by stirring 9.5 g of phthalonitrile monomer of formula (2) with 0.5 g of 4-amino-(3,4-dicyanophenoxy)benzene as a solidifier at 160° C. for 20 minutes) was dissolved in an acetone solution. The resulting solution was heated and stirred until the solvent was completely volatilized, and then subjected to vacuum deaeration to obtain a mixture.

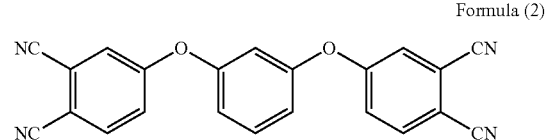 [SMILES: N#Cc1ccc(Oc2cccc(Oc3ccc(C#N)c(C#N)c3)c2)cc1C#N]

Formula (2)

(2) The melt was poured into a preheated mold and pre-cured under normal pressure at 200° C. for 1 hour. Then under a pressure of 15 MPa, the mixture was cured first at 230° C. for 2 hours, then at 250° C. for 2 hours, and finally at 280° C. for 2 hours. The resulting cured mixture was naturally cooled to room temperature, demolded, cured under normal pressure first at 315° C. for 5 hours and then at 375° C. for 5 hours to obtain a phthalonitrile resin cured product.

The phthalonitrile-based composite materials prepared in the examples and comparative examples described above were tested by the following test methods, and the specific test results are shown in Table 2.

(1) Coefficient of Thermal Conductivity Testing:

The composite materials were tested at room temperature for thermal conductivity by transient plane thermal source method (Hot Disk), and this method is a nondestructive testing technique through which testing can be directly conducted with a single-sided detector. The test was conducted at room temperature using a C-THERM TCI thermal conductivity analyzer with a measurement time of 0.8-2.5 s and a sample size of 20×20×2 mm.

(2) Volume Resistivity Testing:

The composite materials were tested at room temperature at a voltage of 500 V for volume resistivity using a PC68 digital high resistance meter, and the sample size was 60×60×2 mm.

TABLE 2

Properties of phthalonitrile resin-based composite materials prepared in Examples B1-B3 and Comparative Examples B1-B4

| Composite material | Thermally conductive filler | Filling amount of thermally conductive filler (vol %) | Coefficient of thermal conductivity (W · m$^{-1}$ · K$^{-1}$) | Volume resistivity (Ω · cm) |
|---|---|---|---|---|
| Example B1 | Boron nitride | 20 | 2.470 | $9.15 \times 10^{12}$ |
| Example B2 | Boron nitride-graphite | 40 | 4.876 | $6.76 \times 10^{12}$ |
| Example B3 | Boron nitride-aluminum oxide-graphite | 40 | 4.303 | $7.44 \times 10^{12}$ |
| Comparative Example B1 | Boron nitride | 20 | 0.718 | $9.01 \times 10^{12}$ |
| Comparative Example B2 | Boron nitride-graphite | 40 | 2.156 | $6.34 \times 10^{5}$ |
| Comparative Example B3 | Boron nitride-aluminum oxide-graphite | 40 | 1.792 | $8.67 \times 10^{6}$ |
| Comparative Example B4 | — | 0 | 0.265 | $2.30 \times 10^{13}$ |

According to the comparison between Examples B1-B3 and Comparative Examples B1-B4 in Table 2, it can be concluded that as the content of the thermally conductive filler increases, the thermally conductive filler easily comes into contact with each other in the resin matrix, making it easier to form a corresponding thermally conductive path, effectively increasing the coefficient of thermal conductivity of the composite material and allowing for better heat conduction. Example B2 has the best thermal conductivity in cases where an equal filling amount of thermally conductive filler is applied.

According to the comparison between Examples B1-B3 and Comparative Examples B1-B3 in Table 2, it can be concluded that the coefficient of thermal conductivity of the phthalonitrile-based composite material with the three-dimensional continuous thermally conductive network structure prepared from the phthalonitrile-based core-shell composite material by hot-pressing is much higher than that of the composite material randomly filled with the same content of thermally conductive filler. It is mainly because that this composite material with the three-dimensional continuous thermally conductive network structure has a phase-separated structure, the thermally conductive filler is a continuous phase, and a thermally conductive path can be formed at a low content of filler; whereas for the randomly filled composite material, only when the content of thermally conductive filler is high, the filler may be mutually overlapped to generate a thermally conductive path.

According to the comparison between Examples B2-B3 and Comparative Examples B2-B3 in Table 2, it can be concluded that the coefficient of thermal conductivity of the phthalonitrile-based composite material with the three-dimensional continuous thermally conductive network structure is much higher than that of the composite material with random distribution. Also, the volume resistivity of the former is several orders of magnitude higher than that of the latter. The phthalonitrile-based composite material with the three-dimensional continuous thermally conductive network structure can give full play to the carbon materials' advantage of having high thermal conductivity, and can meet the electrical insulation requirement, thereby achieving a good effect.

In conclusion, the phthalonitrile-based core-shell composite material prepared by the simple and feasible method of the present disclosure has the advantages of being produced in high yield at low cost and having good properties. The phthalonitrile-based composite material with the three-dimensional continuous thermally conductive network structure prepared from the phthalonitrile-based core-shell composite material by hot-pressing can have higher thermal conductivity and a good electrical insulation property at a low content of thermally conductive filler.

The present disclosure realizes the high-performance thermally conductive and insulating composite material by means of a novel material structure design and processing method, and the excellent overall performance of the polymer-based composite material is well retained.

The embodiments of the present disclosure have been described above. However, the present disclosure is not limited thereto. Any modification, equivalent, improvement and the like made without departing from the spirit and principle of the present disclosure shall fall within the protection scope of the present disclosure.

The invention claimed is:

1. A phthalonitrile-based composite material, comprising aluminum oxide coated graphite particles disposed in a matrix of phthalonitrile resin to form a thermally conductive path, wherein each of the aluminum oxide coated graphite particles comprises a coating on a surface of a graphite particle, wherein the phthalonitrile resin is formed by polymerizing a phthalonitrile monomer of formula (1):

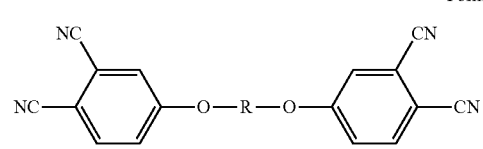

Formula (1)

wherein R is selected from group consisting of:

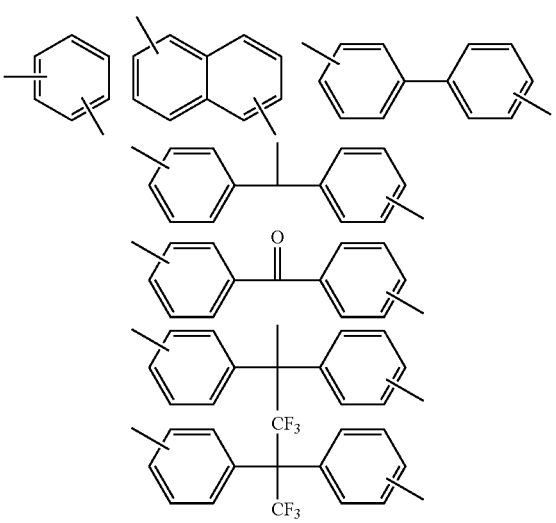

-continued

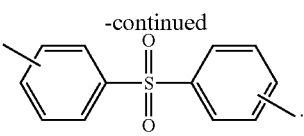

-continued

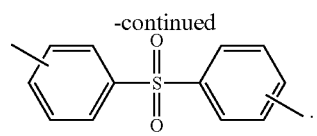

2. A method for preparing a phthalonitrile-based composite material according to claim 1, comprising:
S1: mixing the phthalonitrile monomer, a solidifier, and the aluminum oxide coated graphite particles; and
S2: causing polymerization of the mixture to form the phthalonitrile-based composite material,
wherein S2 is carried out by a hot-pressing reaction, or
wherein S2 further comprises adding the mixture into a mold, performing a first pre-curing under normal pressure, curing under an elevated pressure, demolding, cooling, and post-curing the mixture from the mold under normal pressure to obtain the phthalonitrile-based composite material.

3. A phthalonitrile-based composite material comprising an inner core of a phthalonitrile-based microsphere and a thermally conductive filler that forms a coating on a portion of or a total of a surface of the inner core,
wherein the thermally conductive filler is selected from copper, silver, aluminum, aluminum oxide, silicon nitride, silicon carbide, aluminum nitride, silicon nitride, boron nitride, graphite, graphene, carbon nanotube, aluminum oxide coated graphite composite material, and mixtures thereof, and
wherein a phthalonitrile monomer forming the phthalonitrile resin is selected from a compound of formula (1):

Formula (1)

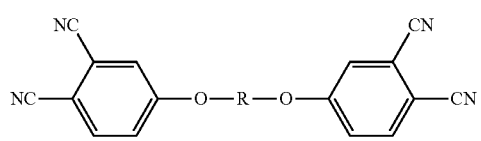

wherein R is selected from the group consisting of:

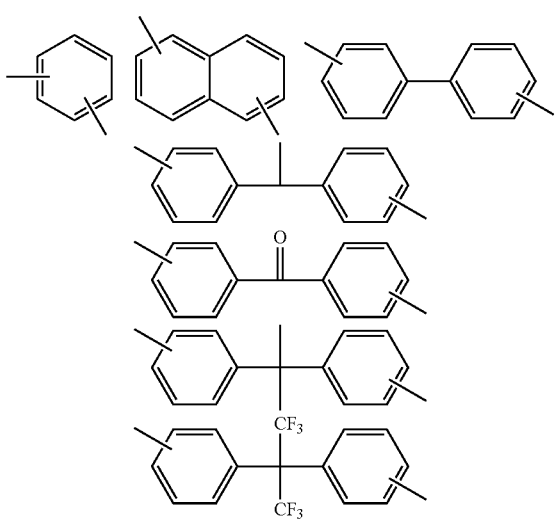

4. A method for preparing the phthalonitrile-based composite material according to claim 3, comprising: at least partially coating the surface of the phthalonitrile-based microsphere with the thermally conductive filler layer to obtain the phthalonitrile-based composite material.

5. A phthalonitrile-based composite material with a three-dimensional continuous thermally conductive network structure, wherein the phthalonitrile-based composite material with the three-dimensional continuous thermally conductive network structure is prepared from the phthalonitrile-based composite material according to claim 3.

6. A method for preparing the phthalonitrile-based composite material with the three-dimensional continuous thermally conductive network structure according to claim 5, comprising:
allowing the phthalonitrile-based composite material with the three-dimensional continuous thermally conductive network structure to be prepared from a starting material comprising the phthalonitrile-based composite material; and
the phthalonitrile-based composite material with the three-dimensional continuous thermally conductive network structure is obtained from the phthalonitrile-based composite material having the core-shell structure by hot-pressing reaction.

7. The method according to claim 2, wherein the thermally conductive filler forms a layer that covers a total of the surface of the inner core;
or, further comprising coating a phthalonitrile resin layer on the inner core and then coating the thermally conductive filler layer on the phthalonitrile resin layer;
or, when the number of layers of the thermally conductive filler layer is two, three or more, a phthalonitrile resin layer is provided between adjacent thermally conductive filler layers.

8. The phthalonitrile-based composite material according to claim 1, wherein the aluminum oxide coated graphite particles are uniformly distributed in the phthalonitrile matrix resin.

9. The method according to claim 2,
wherein the method uses 100 parts by weight of the phthalonitrile monomer, 1-10 parts by weight of the solidifier, and 5-50 parts by weight of the aluminum oxide coating graphite particles.

10. The method according to claim 4, further comprising:
sequentially coating the surface of the phthalonitrile-based microsphere with the phthalonitrile resin layer and the first thermally conductive filler layer to obtain a phthalonitrile-based core-shell composite material having one thermally conductive filler layer; or
sequentially coating the surface of the phthalonitrile-based core-shell composite material having one thermally conductive filler with the phthalonitrile-based resin layer and the second thermally conductive filler layer to obtain a phthalonitrile-based core-shell composite material having two thermally conductive filler layers.

11. The phthalonitrile-based composite material according to claim 1, having a porosity of less than 2.5% and a glass transition temperature of 450-465° C.

* * * * *